(12) United States Patent
Preg

(10) Patent No.: US 8,756,872 B2
(45) Date of Patent: Jun. 24, 2014

(54) ROTATABLE HUNTING BLIND

(76) Inventor: Jeffrey K. Preg, Montgomery, AL (US)

( * ) Notice: Subject to any disclaimer, the term of this patent is extended or adjusted under 35 U.S.C. 154(b) by 56 days.

(21) Appl. No.: 13/485,674

(22) Filed: May 31, 2012

(65) Prior Publication Data

US 2012/0304551 A1 Dec. 6, 2012

Related U.S. Application Data

(60) Provisional application No. 61/457,764, filed on May 31, 2011.

(51) Int. Cl.
*E04H 15/00* (2006.01)

(52) U.S. Cl.
USPC .......................... 52/65; 52/70; 52/71; 135/901

(58) Field of Classification Search
CPC . E04H 15/001; E04H 1/1205; E04H 17/1413; E04H 12/2261
USPC .................................. 52/65, 70, 71; 135/901
See application file for complete search history.

(56) References Cited

U.S. PATENT DOCUMENTS

| | | | | |
|---|---|---|---|---|
| 2,992,503 A | * | 7/1961 | Webb | 43/1 |
| 3,018,857 A | * | 1/1962 | Parham | 52/63 |
| 3,427,768 A | * | 2/1969 | Fulton | 52/27.5 |
| 3,513,605 A | * | 5/1970 | Smith | 52/20 |
| 3,902,264 A | | 9/1975 | Radig | |
| 4,161,924 A | * | 7/1979 | Welker | 119/482 |
| 4,174,594 A | * | 11/1979 | Panzini | 52/65 |
| 4,412,398 A | | 11/1983 | Harmon | |
| 4,571,898 A | * | 2/1986 | Le Cacheux et al. | 52/36.2 |
| 4,782,616 A | * | 11/1988 | Hambleton | 43/1 |
| D337,366 S | | 7/1993 | Baker | |
| 5,241,772 A | | 9/1993 | Hall | |
| 5,371,966 A | * | 12/1994 | Hall | 43/1 |
| 6,415,807 B1 | * | 7/2002 | Maher | 135/99 |
| 6,553,725 B2 | * | 4/2003 | Washington | 52/64 |
| 6,581,337 B1 | * | 6/2003 | Skov et al. | 52/79.5 |
| 6,769,442 B2 | | 8/2004 | Johnson | |
| 7,188,635 B2 | * | 3/2007 | Johnson | 135/87 |
| 8,033,060 B2 | * | 10/2011 | Parker et al. | 52/65 |
| 2005/0028854 A1 | * | 2/2005 | Erickson et al. | 135/97 |
| 2008/0135080 A1 | | 6/2008 | Greene | |
| 2010/0229906 A1 | * | 9/2010 | Putman | 135/96 |
| 2011/0079257 A1 | | 4/2011 | Slinkard et al. | |
| 2011/0203629 A1 | | 8/2011 | Smith | |

* cited by examiner

*Primary Examiner* — Adriana Figueroa
(74) *Attorney, Agent, or Firm* — Jonathan C. "Rudy" Hill; Angela Holt; Bradley Arant Boult Cummings LLP

(57) ABSTRACT

A hunting blind rotates 360 degrees to provide a hunter with unobstructed views. A rotatable enclosure rotates atop a base that is affixed to the ground for stability. The rotatable enclosure contains a seat rigidly affixed to a back wall, a top rotatably affixed to the back wall, and right and left side walls hingedly affixed to the back wall. Either the right or left side wall serves as a door to allow the hunter access to enter the blind. The other side wall is rigidly connected to the seat to add stability to the enclosure. The hunter can place the blind pre-season in the middle of a field, for example, which can increase shot opportunities by providing the hunter with an expansive field of view. The component parts of the blind are generally lightweight, and the blind can therefore be easily transported and assembled in the field.

16 Claims, 16 Drawing Sheets

ROTATABLE HUNTING BLIND

REFERENCE TO RELATED APPLICATIONS

This application claims priority to Provisional Patent Application U.S. Ser. No. 61/457,764, entitled "No Blind 360" and filed on May 31, 2011, which is fully incorporated herein by reference.

BACKGROUND & SUMMARY

An apparatus according to an embodiment of the present disclosure comprises a hunting blind that rotates 360 degrees to provide a hunter with virtually unobstructed panoramic views. A rotatable enclosure rotates atop a base that is affixed to the ground for stability. The rotatable enclosure contains a seat rigidly affixed to a back wall, a top rotatably affixed to the back wall, and right and left side walls hingedly affixed to the back wall. Either the right or left side wall serves as a door to allow the hunter access to enter the blind. The other side wall is rigidly connected to the seat to add stability to the enclosure.

The hunter can place the blind pre-season in the middle of a field, for example, which can increase shot opportunities by providing the hunter with an expansive field of view. The component parts of the blind are generally lightweight, and the blind can therefore be easily transported and assembled in the field. Further, ground-based embodiments of the blind offer safety advantages over tree- or platform-based hunting stands.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

Figure 1:
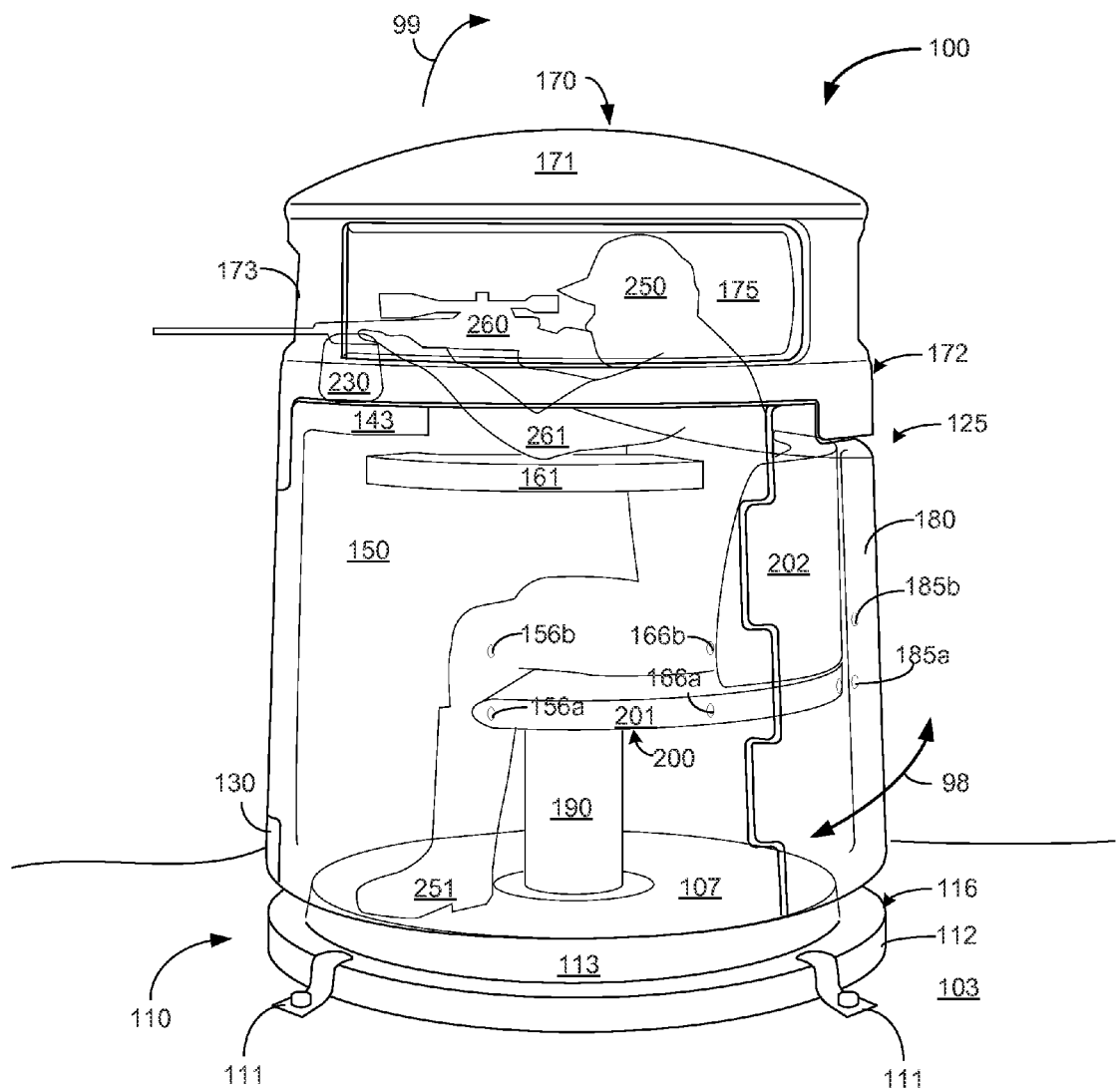
FIG. 1 is a side perspective view of a rotatable hunting blind according to an embodiment of the present disclosure.

Repeat use of reference characters throughout the present specification and appended drawings is intended to represent the same or analogous features or elements of the invention.

DETAILED DESCRIPTION

FIG. 1 depicts a side perspective view of an exemplary embodiment of a rotatable hunting blind 100 with a hunter 250 inside. The rotatable hunting blind 100 comprises a base 110 rotatably connected to a rotatable enclosure 125. The rotatable enclosure 125 rotates freely about a central vertical axis (not shown) of the base 110 for a full 360 degrees in the direction indicated by reference arrow 98 (i.e., in a generally horizontal plane). The rotation is accomplished as quietly as possible so as not to frighten game. The 360-degree rotation provides a hunter 250 with a 360-degree view and allows a hunter 250 seated within the enclosure 125 to rotate the blind 100 the full 360 degrees without changing his or her seating position or gun 260 position. The stand 100 is illustrated in FIG. 1 as transparent to show some of the internal components of the stand 100 for the purposes of explanation only.

The base 110 rests on a surface 103 and is secured by one or more clamps 111. In one embodiment, the surface 103 is the ground (i.e., the earth). However, in other embodiments, the base 110 may be secured to other surfaces, for example, a platform of a raised stand (not shown), such as a tree stand (not shown). The base 110 comprises a lower flange 112 and a raised platform 113 protruding upwardly from an upper surface 116 of the lower flange 112. In one embodiment, the lower flange 112 has an outer diameter of 48 inches, but may be differently dimensioned in other embodiments.

The base 110 may be constructed from any suitable strong and rigid material that will withstand the weather, such as plastic, metal, or composite materials, and the like. In the illustrated embodiment, the base 110 is constructed of double-walled, rotationally molded and/or blow-molded polyethylene from a single polyethylene mold.

The rotatable enclosure 125 comprises a right side wall 130 and a left side wall 150. The right side wall 130 and the left side wall 150 are each hingedly affixed to a back wall 180.

The rotatable enclosure 125 further comprises a top 170 that is hingedly affixed to the back wall 180. The top 170 is openable in the direction indicated by directional arrow 99. The top 170 is generally cylindrical and is domed in the illustrated embodiment to direct rainwater (not shown) from the enclosure 125. Generally, the right side wall 130, the left side wall 150, the back wall 180, and the top 170, connect and/or interlock together to form the rotatable enclosure 125, as further discussed herein.

The top 170 of the rotatable enclosure 125 comprises a water-resistant roof 171 and a viewing frame 172. The roof 171 is generally circular and domed or arched to allow the hunter 250 to have more headroom and to facilitate the runoff of moisture.

The viewing frame 172 extends downwardly from and is integral with the roof 171. The viewing frame 172 comprises a shooting window 173 located on a frontward side, directly in front of the hunter 250. The shooting window 173 is a generally rectangularly-shaped opening through which the gun 260 extends for firing. The shooting window 173 remains open (i.e., it does not have a window pane or screen) in the illustrated embodiment.

The viewing frame 172 further comprises a right viewing window (not shown) and a left viewing window 175. The right viewing window (not shown) and left viewing window 175 extend around the viewing frame 172 and provide wide-angle side viewing for the hunter 250, as further discussed herein.

The viewing frame 172 generally conforms to the profile of the rotatable enclosure 125, which allows for positioning of the rotatable hunting blind 100 in the open due to its generally constant, unchanging profile, even during rotation.

In operation of the rotatable hunting blind, the hunter 250 sits upon a swivel seat 200 within the enclosure 125 as illustrated. The swivel seat 200 is comprised of a bench seat 201 upon which the hunter 250 sits and a back rest 202, which is rigidly affixed to the bench seat 201. The bench seat 201 is rotatably coupled to the platform 110 via a seat base 190, as further discussed herein.

The swivel seat 200 is rigidly affixed to the enclosure 125 and rotates with the enclosure 125. In this regard, the bench seat 201 of the seat 200 is affixed to the back wall 180 via a fastener (not shown) that extends through an opening 185a in the back wall 180 and into the bench seat 201. The bench seat 201 is similarly affixed to either the right side wall 130 or the left side wall 150, but not both walls 130 and 150. The wall 130 or 150 that is not affixed to the bench seat is rotatably openable and serves as a door through which the hunter 250 enters and exits the enclosure 125, as further discussed herein. In this regard, the left side wall 150 comprises a plurality of openings 156a and 166a through which fasteners (not shown) may extend to affix the bench seat to the left side wall 150. The right side wall 130 has similarly situated openings (not shown), as further discussed herein.

The heights of the shooting window 173, right viewing window (not shown) and left viewing window 175 with respect to the hunter 250 are adjustable by adjusting the position that the bench seat 201 connects to the back wall 180 and one of the side walls 130 or 150. In this regard, the bench seat 201 may be affixed to the back wall 180 and one of the side walls 130 or 150 using openings 185b, 166b and 156b instead of lower-placed 185a, 166a and 156a openings. Using the higher-placed openings 185b, 166b and 156b will reduce the distance between the bench seat 201 and the shooting window 173, and the right viewing window (not shown) and the left viewing window 175, to accommodate a shorter hunter 250.

The enclosure 125 comprises a shooting tray 143 that extends from the right side wall 130 and left side wall 150 and receives a shooting rest 230, which the hunter 250 can use to brace the gun 260. The left side wall 150 comprises an armrest 161 on which the hunter 250 may brace his arm 261.

In order to rotate the enclosure 125, the hunter 250 simply swivels the swivel seat 200 with his feet 251 braced on an upper surface 107 of the raised platform 113. Because the swivel seat 200 is rigidly affixed to the enclosure 125, the enclosure 125 rotates with the swivel seat 200.

Figure 2:
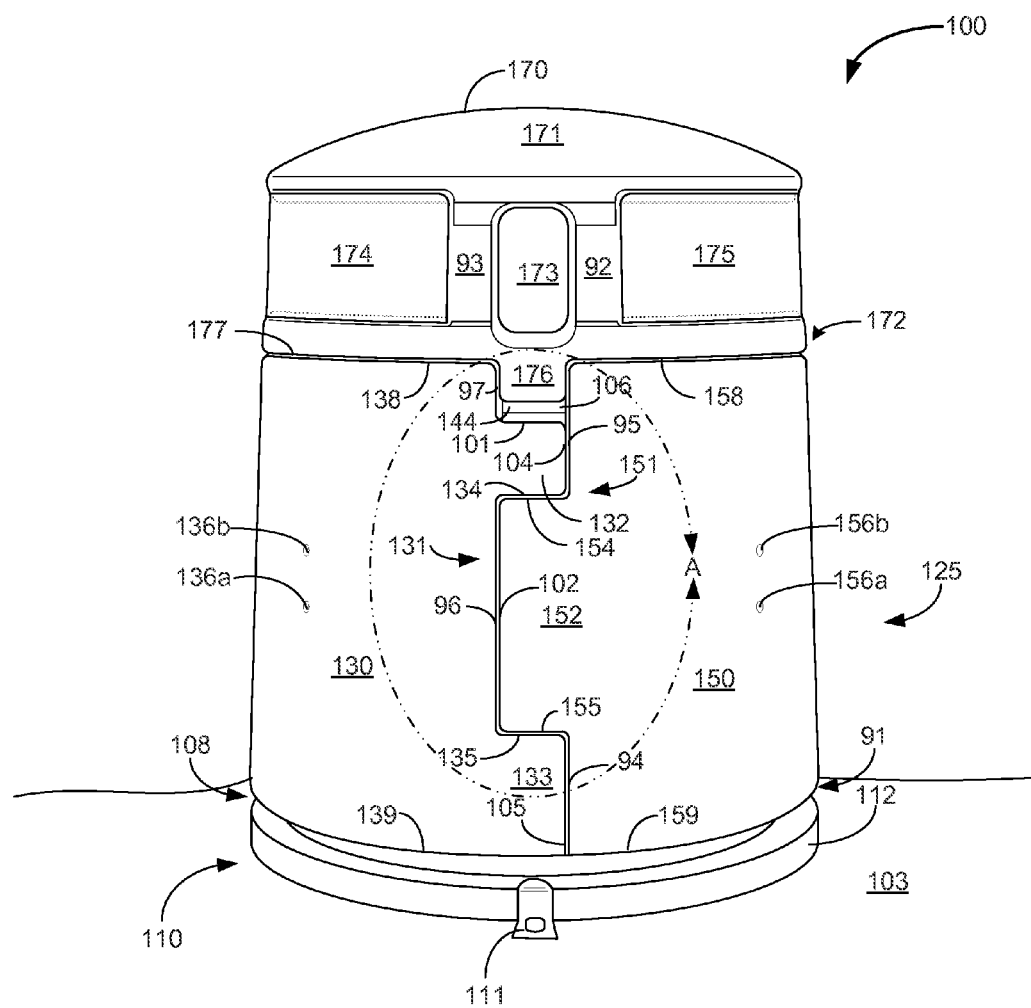
FIG. 2 is a front perspective view of the rotatable hunting blind of FIG. 1.

FIG. 2 is a front perspective view of the rotatable hunting blind 100 of FIG. 1, with no hunter 250 (FIG. 1) inside. The rotatable enclosure 125 comprises the right side wall 130 and left side wall 150. The right side wall 130 and the left side wall 150 are each hingedly affixed to the back wall 180 (FIG. 1). The right side wall 130 comprises a right side upper edge 138 and a right side lower edge 139. The right side upper edge 138 is generally parallel to the right side lower edge 139. The left side wall 150 comprises a left side upper edge 158 and a left side lower edge 159, and the left side upper edge 158 is generally parallel to the left side lower edge 159. The right side wall 130, left side wall 150 and back wall 180 (FIG. 1) are each curved and together form a generally cylindrical shape, which gently flares outwardly from the upper edges 138 and 158 to the lower edges 139 and 159 as shown. The flaring of the enclosure 125 adds stability to the enclosure 125. In other embodiments, the enclosure 125 may be differently-shaped.

A right front side edge 131 of the right side wall 130 aligns with a left front side edge 151 of the left side wall 150 when the enclosure 125 is in a "closed" position. In the illustrated embodiment, the right front side edge 131 is not a straight edge that extends from the upper edge 138 to the lower edge 139, and the left front side edge 151 is not a straight edge that extends from the upper edge 158 to the lower edge 159—though this may be the case in other embodiments. In the illustrated embodiment, however, the right front side edge 131 is comprised of a plurality of edges 97, 101, 104, 134, 96, 135, and 105 that interconnect to extend from the upper edge 138 to the lower edge 139, as further discussed herein. The left side edge 151 is comprised of a plurality of edges 95, 154, 102, 155, and 94 that interconnect to extend from the upper edge 158 to the lower edge 159.

The edge 97 is generally vertical in the illustrated embodiment and extends downwardly generally perpendicularly from the upper edge 138; the edge 101 is generally horizontal and extends generally perpendicularly from the edge 97 to the edge 104. The edges 97 and 101 do not extend through a width of the wall 130 in the illustrated embodiment. Rather, the edges 97 and 101 form a recessed portion 144 that receives a handle 176, as further illustrated in FIG. 4. The edge 104 is generally vertical and extends generally perpendicularly from the upper edge 138 to the edge 134; the edge 134 is generally horizontal and extends generally perpendicularly from the edge 104 to the edge 96; the edge 96 is generally vertical and extends generally perpendicularly from the edge 134 to the edge 135; the edge 135 is generally horizontal and extends generally perpendicularly from the edge 96 to the edge 105; the edge 105 is generally vertical and extends generally perpendicularly from the edge 135 to the lower edge 139.

The edges 101, 104 and 134 form an upper extended portion 132 that extends generally rectangularly from the right front side edge 131 of the right side wall 130. The edges 135 and 105, combined with the lower edge 139, form a lower extended portion 133 that extends from the right front side edge 131. The upper extended portion 132 and lower extended portion 133 are coextensive with and aligned with the right side wall 130.

The edge 95 is generally vertical in the illustrated embodiment and extends downwardly generally perpendicularly from the upper edge 158; the edge 154 is generally horizontal and extends generally perpendicularly from the edge 95 to the edge 102; the edge 102 is generally vertical and extends generally perpendicularly from the edge 154 to the edge 155; the edge 155 is generally horizontal and extends generally perpendicularly from the edge 102 to the edge 94; the edge 94 is generally vertical and extends generally perpendicularly from the edge 155 to the lower edge 159.

The edges 154, 102, and 155 form an extended portion 152 that extends generally perpendicularly from the front side edge 151. The extended portion 152 is coextensive with and aligned with the left side wall 150.

When the enclosure 125 is in its "closed" orientation as shown, the edge 104 of the right side wall 130 becomes closely aligned with, i.e., either contacts or nearly contacts, the edge 95 of the left side wall 150. Similarly, the edge 134 of the right side wall becomes closely aligned with the edge 154 of the left side wall 150; the edge 96 of the right side wall 130 becomes closely aligned with the edge 102 of the left side wall 150; the edge 135 of the right side wall 130 becomes closely aligned with the edge 155 of the left side wall 150; and the edge 105 of the right side wall 130 becomes closely aligned with the edge 94 of the left side wall 150. Locking mechanisms (not shown) on the right side wall 130 and left side wall 150 maintain the walls 130 and 150 together when the enclosure 125 is closed. These locking mechanisms are discussed with respect to FIG. 2a herein.

The right side wall 130 comprises one or more generally cylindrical openings 136a and 136b that extend generally horizontally through the wall 130 to receive fasteners (not shown) that may affix the right side wall 130 to the swivel seat 200 (FIG. 1) located on the inside of the rotatable hunting blind 100. Either openings 136a or 136b, but generally not both openings, will be used at one time, because the height of the seat 200 with respect to the windows 173 (FIG. 1), 174 and 175 is adjustable based upon the position of the fasteners (not shown) through the wall 130 and into the bench seat 201 (FIG. 1), as discussed above with respect to FIG. 1.

Similarly, the left side wall 150 contains one or more generally cylindrical openings 156a and 156b that extend generally horizontally through the wall 150 to receive fasteners (not shown) that may affix the left side wall 150 to the swivel seat 200 (FIG. 1) located on the inside of the rotatable hunting blind 100. Either openings 156a or 156b, but generally not both openings, will be used at one time, because the height of the seat 200 with respect to the windows 173 (FIG. 1), 174 and 175 is adjustable based upon the position of the fasteners (not shown) through the wall 150 and into the bench seat 201 (FIG. 1), as discussed above with respect to FIG. 1. Further, as discussed above, only one of either the right side wall 130 and the left side wall 150 is affixed to the seat 200 (FIG. 1), and the unaffixed wall 130 or 150 acts as the door for opening the enclosure 125.

Figure 3:
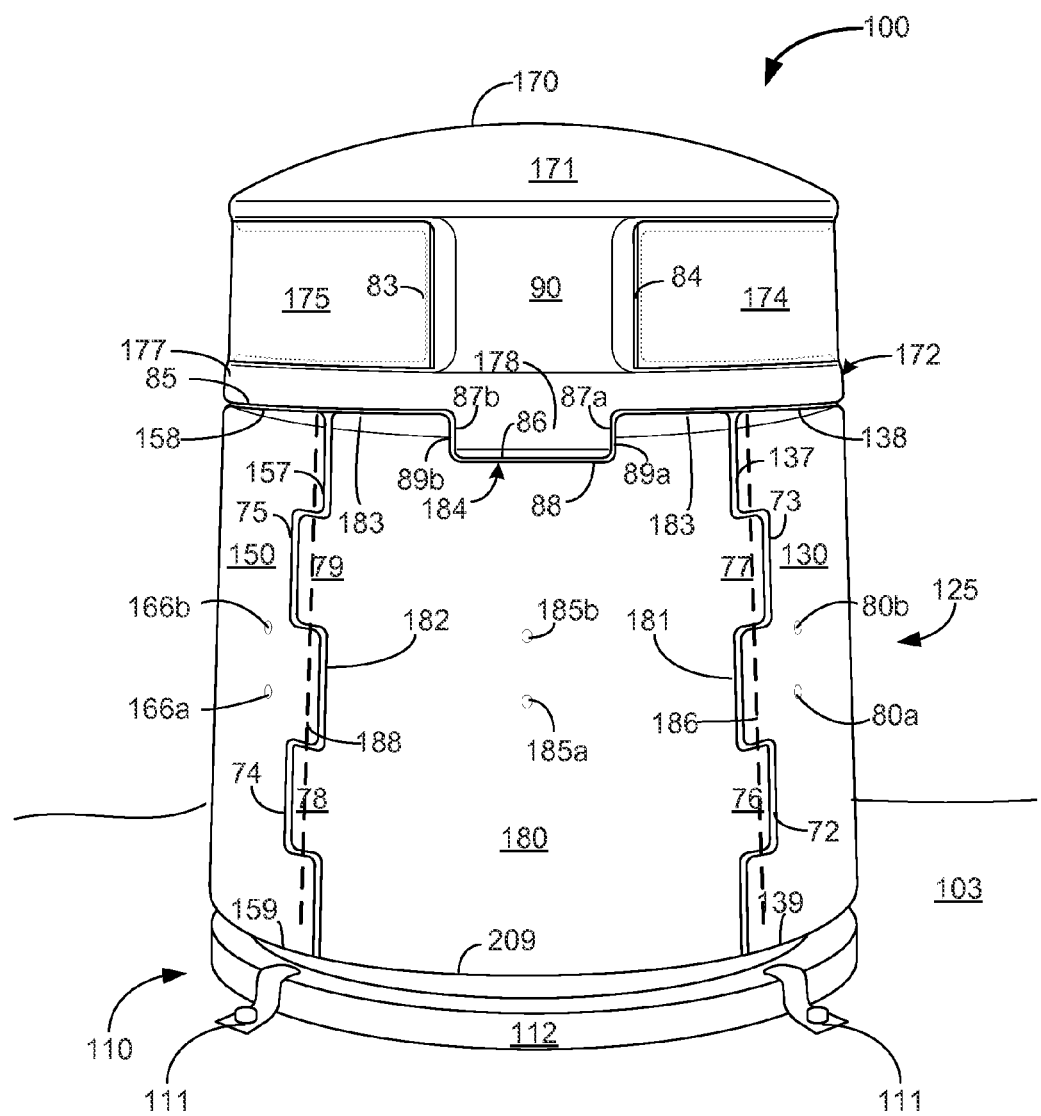
FIG. 3 is a rear perspective view of the rotatable hunting blind of FIG. 1.

Although the illustrated embodiment provides for two (2) different positions of the seat 200 (FIG. 1), with its openings 136a and 136b and 156a and 156b, it is understood that multiple heights for the seat 200 could be provided by adding additional openings aligned vertically with the openings 136a and 136b and 156a and 156b. FIG. 2 depicts one "set" of openings 136a and 136b located toward the front of the right side wall 130 and one set of cylindrical openings 156a and 156b located toward the front of the left side wall 150. Another set of openings (not shown) is located toward the rear of the right side wall 130 and toward the rear end of the left side wall 150. These second sets of openings are depicted in FIG. 3.

The top 170 comprises the shooting window 173, which is generally rectangular with rounded corners in the illustrated embodiment. In one embodiment, the shooting window 173 measures generally 12 inches in height and 7 inches in width. Other shapes and dimensions of shooting windows are provided in other embodiments. The shooting window 173 is typically large enough for the gun (not shown) to extend therethrough and to allow the hunter (not shown) sufficient space to view in order to make an accurate shot.

The shooting window 173 is bounded on its top side by the roof 171. A right roof support 93 and a left roof support 92 bound opposed sides of the shooting window 173. The right roof support 93 and the left roof support 92 each extend generally vertically from the roof 171 to a bottom rim 177 of the viewing frame 172. The bottom rim 177 extends generally circularly around the bottom of the viewing frame 172.

The viewing frame 172 comprises the right viewing window 174 and the left viewing window 175. The right viewing window 174 extends from the right roof support 93 along the right side of the viewing frame 172 and terminates at the back (not shown) of the viewing frame 172. The left viewing window 175 extends from the left roof support 92 along the left side of the viewing frame 172 and terminates at the back (not shown) of the viewing frame 172.

The right viewing window 174 and the left viewing window 175 comprise openings that may receive panels (not shown) of clear Plexiglas or other similarly generally transparent materials, such as tinted Plexiglas, aluminum screening, one way viewing glass, or the like. In one embodiment, the right viewing window 174 and the left viewing window 175 measure 50 inches in width and 11 inches in height. Other measurements are used in other embodiments. In any event, the right viewing window 174 and the left viewing window 175 should extend around the viewing frame 172 to an extent that permits the hunter the widest possible viewing area to observe game outside of the rotatable hunting blind 100.

Figure 8:
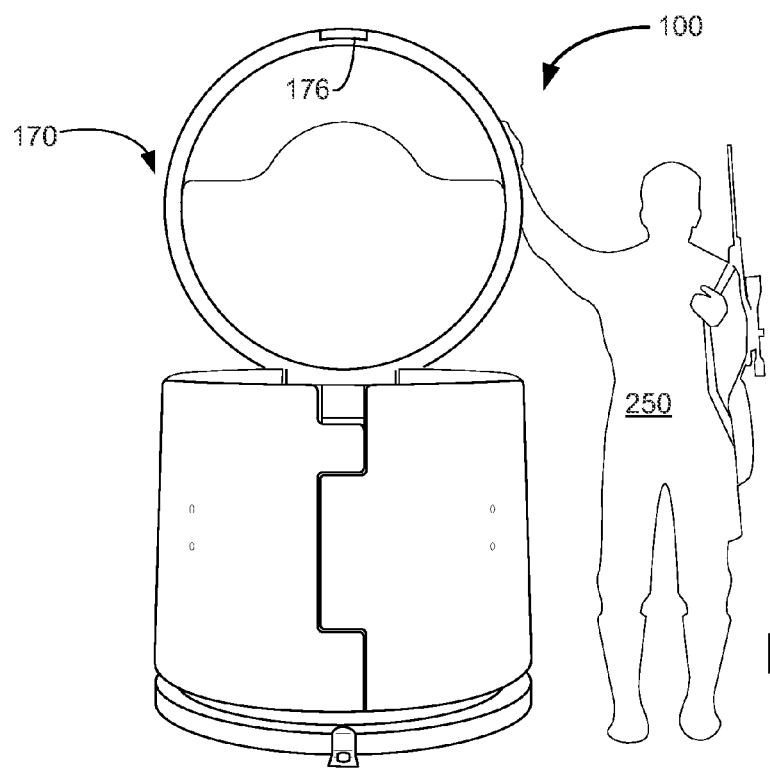
FIG. 8 is a front perspective view of the rotatable hunting blind of FIG. 1 with the top in the open position to demonstrate how a hunter enters the blind.
Figure 9:
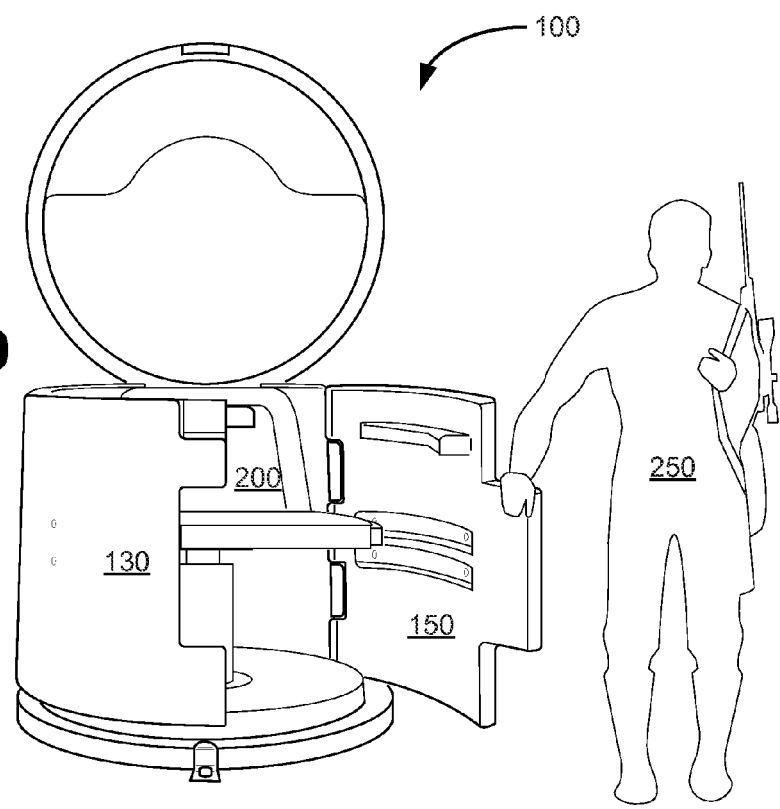
FIG. 9 is a front perspective view of the rotatable hunting blind of FIG. 8 that further demonstrates how a hunter enters the blind.
Figure 10:
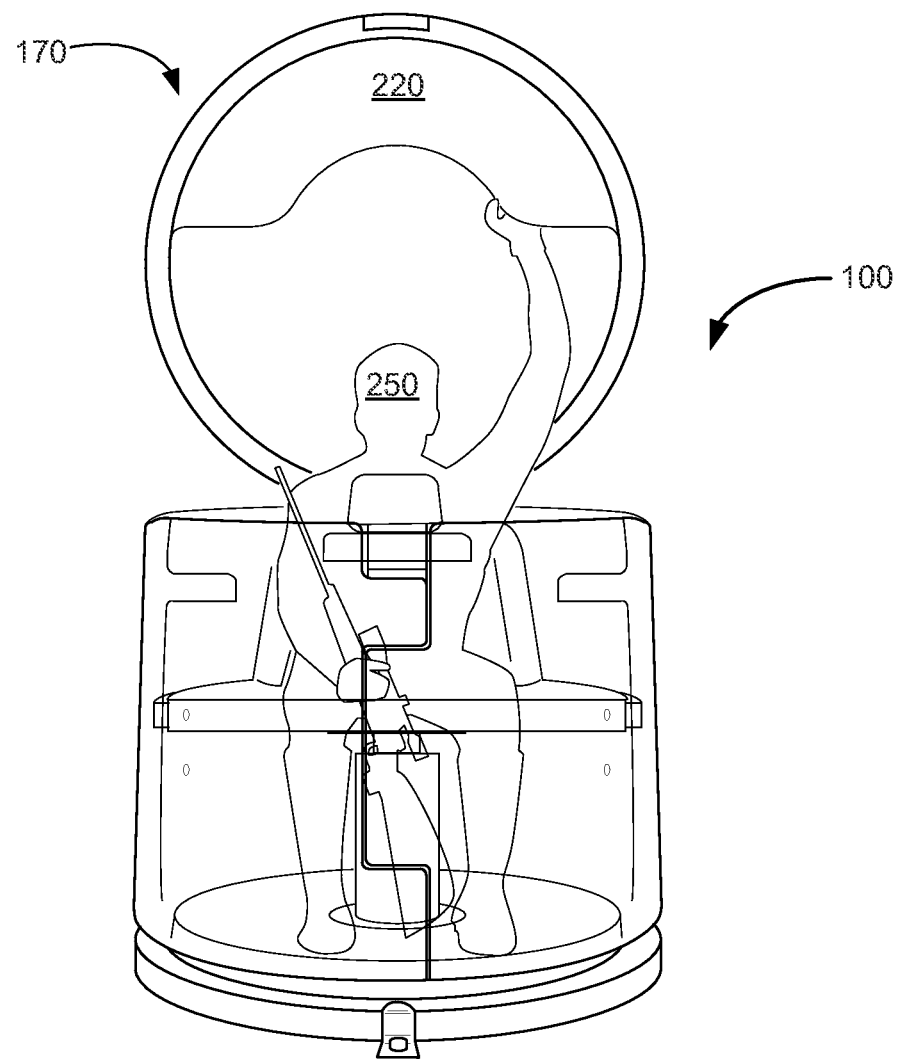
FIG. 10 is a front perspective view of the rotatable hunting blind of FIG. 8 that further demonstrates how a hunter enters the blind.

The viewing frame 172 contains a top handle 176 that extends below the bottom rim 177 of the top 170, directly below the shooting window 173, in the illustrated embodiment. The top handle 176 allows the hunter (not shown) to open the top 170 from the outside of the rotatable hunting blind 100 for entry, and allows the hunter to close the top 170 once he or she is positioned inside of the rotatable hunting blind 100. FIGS. 8-10 demonstrate this process. When the enclosure 125 is in its closed position as illustrated, the top handle 176 is received within the recessed portion 144 of the right side wall 130. The handle 176 is bounded on its right side by and is closely aligned with the edge 97 of the right side wall 130, and is bounded on its left side by and is closely aligned with the edge 95 of the left side wall 150. The top handle 176 is bounded on its lower side by the edge 101, and a gap 106 between the edge 101 and the handle 176. The gap 106 allows the hunter's hand (not shown) sufficient clearance to grasp the handle 176 from its underside. The top handle 176 thus does not completely "fill" the recessed portion 144 when the top 170 is closed, but rather leaves clearance for the gap 106. The handle 176 generally aligns with a rectangular portion of the enclosure 125 formed by the edge 97, the edge 101, and the edge 95, as shown.

The top 170 may be constructed from any suitable water-resistant material, such as plastic, metal, composite, and the like. In one embodiment, the top 170 is constructed of double-walled, rotationally molded and/or blow-molded polyethylene from a single polyethylene mold.

A gap 108 is disposed between the lower flange 112 of the base 110 and a bottom edge 91 of the enclosure 125, which is formed from the lower edges 139 of the right side wall 130, 159 of the left side wall 150, and a lower edge (not shown) of the back wall (not shown). The width of the gap 108 is determined by the position of the swivel seat 200 with respect to the walls 130, 150, and 180 (FIG. 1), as further discussed herein. The gap 108 increases air circulation within the enclosure 125 to help cool the enclosure 125 on warm days.

Figure 2A:
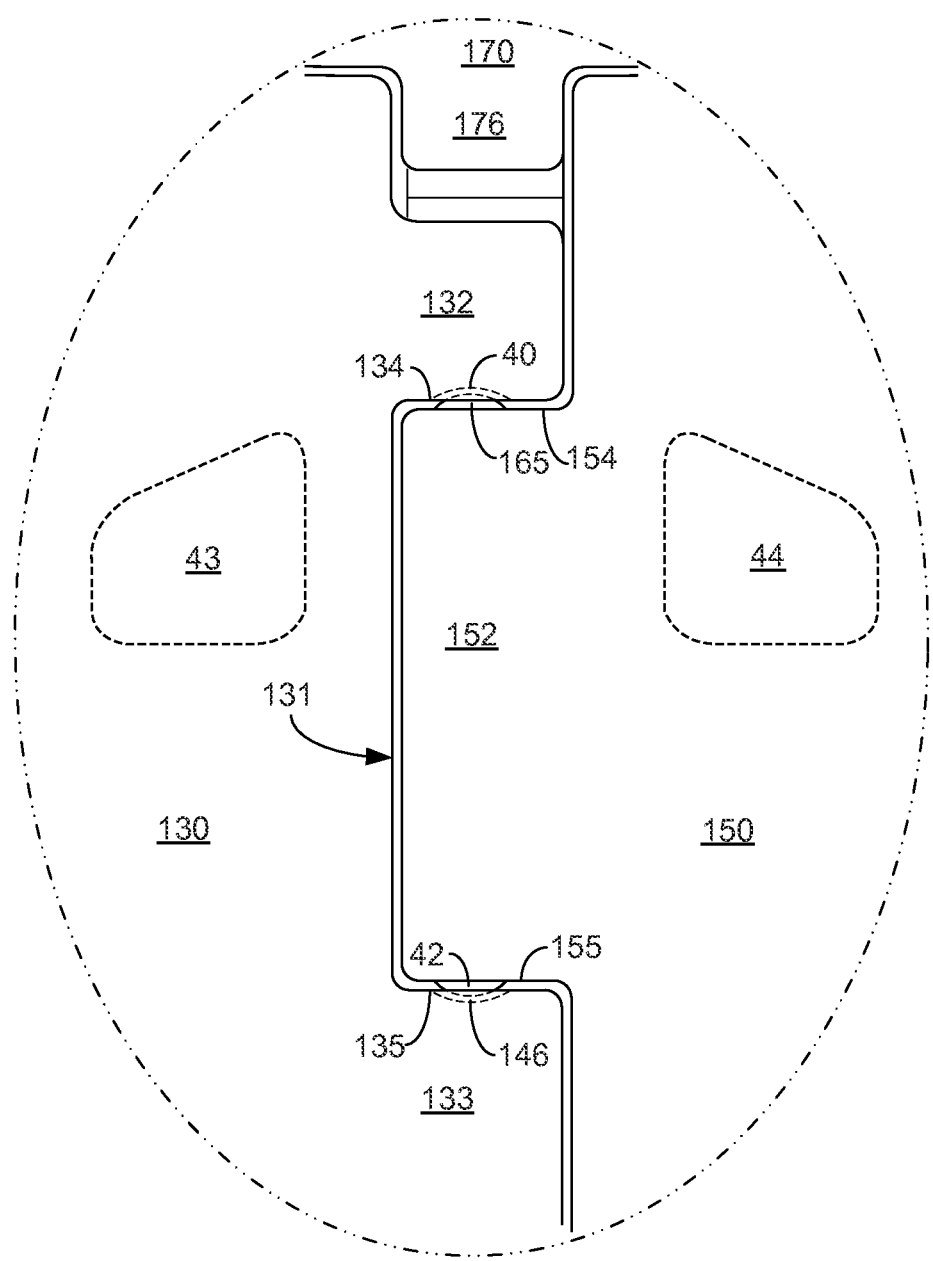
FIG. 2a is an enlarged detail view of the rotatable hunting blind of FIG. 2, taken along detail line "A" of FIG. 2.

FIG. 2a is an enlarged detail view of the rotatable hunting blind of FIG. 2, taken along detail line "A" of FIG. 2. The front side edge 131 of the right side wall 130 comprises the upper extended portion 132 and the lower extended portion 133. The upper extended portion 132 is rectangular and comprises the edge 134, which comprises a recess 40 that engages with a protrusion 165 in the edge 154 of the left side wall 150 to interlock the right side wall 130 with the left side wall 150. In this regard, the recess 40 is recessed within the edge 134 and is sized slightly larger than the protrusion 165, so that the recess 40 receives and frictionally retains the protrusion 165.

The lower extended portion 133 is rectangular and comprises the edge 135, which comprises a recess 146 that engages with a protrusion 42 in the edge 155 of the left side wall 150 to further interlock the right side wall 130 with the left side wall 150. In this regard, the recess 146 is recessed within the edge 135 and is sized slightly larger than the protrusion 42, so that the recess 146 receives and frictionally retains the protrusion 42.

A handle 43 is comprised on an inner surface (not shown) of the right side wall 130, and a mirror-imaged handle 44 is comprised on an inner surface (not shown) of the left side wall 150. The handles 43 and 44 each comprise indentations into the inner surfaces that receive the hunter's hands (not shown) to facilitate closing the side wall 130 or 150 that is serving as the door, as further discussed herein.

FIG. 3 is a rear perspective view of the embodiment of the rotatable hunting blind 100 shown in FIG. 1. The base 110 is secured to the surface 103 by one or more clamps 111. The rotatable enclosure 125 rotatably rests on the base 110. Generally, the right side wall 130, the left side wall 150, the top 170, and the back wall 180 connect and/or interlock to form the rotatable enclosure 125.

A rear side edge 137 of the right side wall 130 is hingedly affixed to a right side edge 181 of the back wall 180. In a similar fashion, a rear side edge 157 of the left side wall 150 is hingedly affixed to a left side edge 182 of the back wall 180. The rear side edge 137 of the right side wall 130 and the right side edge 181 of the back wall 180 comprise openings (not shown) extending therethrough that align with one another to receive a right hinge pin 186 (shown in broken lines). The right hinge pin 186 forms a hinged connection between the right side wall 130 and the back wall 180 and allows the right side wall 130 to pivot about a generally vertical axis (not shown) of the right hinge pin 186. In the illustrated embodiment, the right hinge pin 186 has a length generally equal to or greater than the height of the right side wall 130, which allows the right hinge pin 186 to extend for substantially all of the length of the hinged connection between the right side wall 130 and the back wall 180.

The right side wall 130 comprises recessions 73 and 72 that receive protrusions 77 and 76, respectively, extending from the right side edge 181 of the back wall 180 as shown. The right hinge pin 186 extends through the openings (not shown) in the rear side edge 137 of the right side wall 130 and through the aligned openings in the protrusions 77 and 76 to hingedly affix the right side wall 130 to the back wall 180.

Similarly, the rear side edge 157 of the left side wall 150 and the left side edge 182 of the back wall 180 comprise openings extending therethrough that align with one another and receive a left hinge pin 188 (shown in broken lines). The left hinge pin 188 forms a hinged connection between the left side wall 150 and the back wall 180 and allows the left side wall 150 to pivot about a generally vertical axis of the left hinge pin 188. The left hinge pin 188 has a length generally equal to or greater than the height of the left side wall 150, which allows the left hinge pin 188 to extend for substantially all of the length of the hinged connection between the left side wall 150 and the back wall 180.

The left side wall 150 comprises recessions 75 and 74 that receive protrusions 79 and 78, respectively, extending from the left side edge 182 of the back wall 180 as shown. The left hinge pin 188 extends through the openings (not shown) in the rear side edge 157 of the left side wall 150 and through aligned openings in the protrusions 79 and 78 to hingedly affix the left side wall 150 to the back wall 180.

Figure 6:
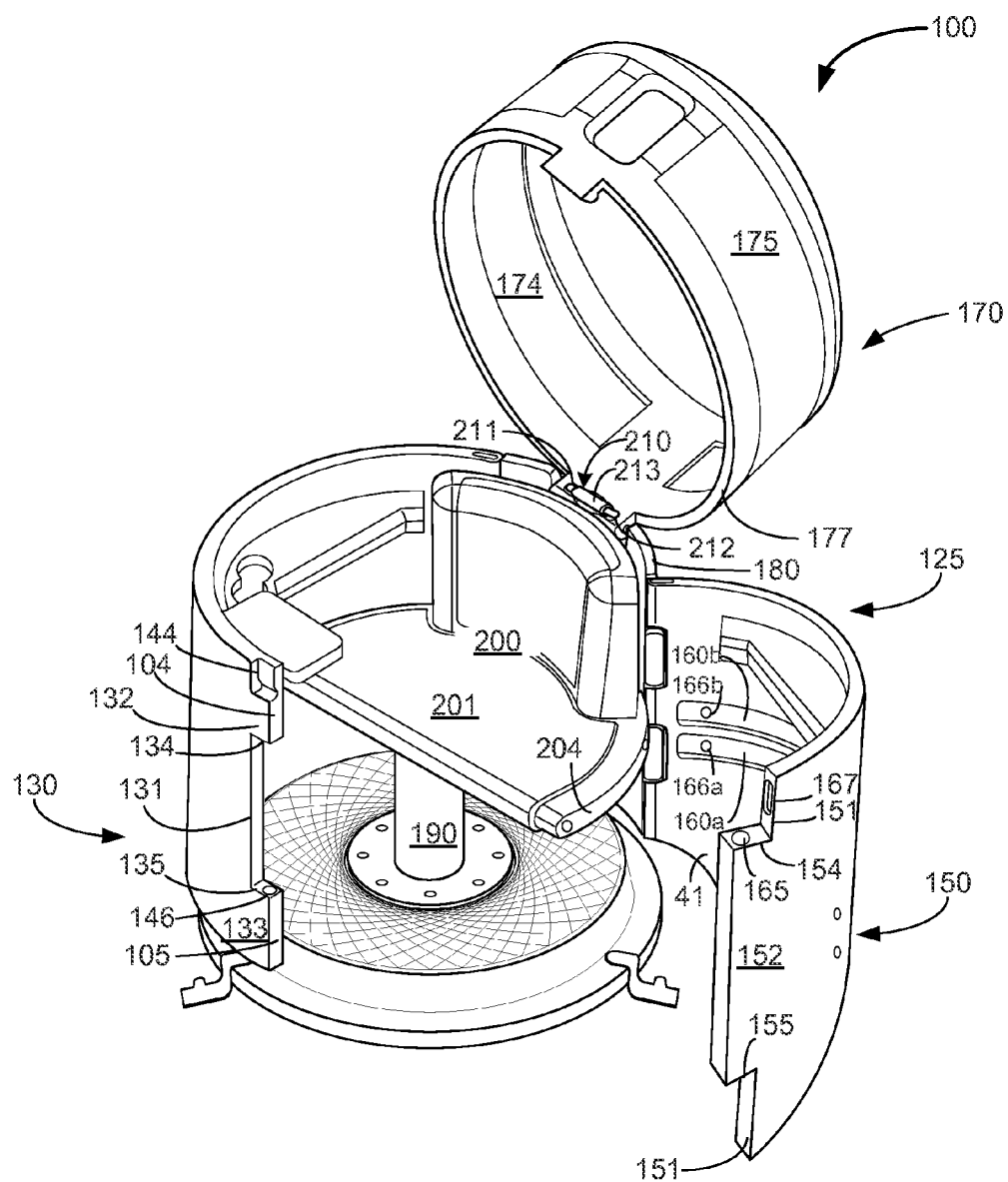
FIG. 6 is a front/side perspective view of the rotatable hunting blind of FIG. 1 with the top and left side wall in an open position.

The top 170 is hingedly attached to the back wall 180, and the top 170 is pivotable to pivot generally 90 degrees up and down between an open position and a closed position. FIGS. 1-3 depict the top 170 in its closed position. FIG. 6 depicts the top 170 in its open position. A top edge 183 of the back wall 180 contains a recessed portion 184 that receives an extended portion 178 of the bottom rim 177. A top hinge pin (not shown) extends through the extended portion 178 to hingedly affix the top 170 to the back wall 180, as further discussed herein.

When the top 170 is closed, the top edge 183 of the back wall 180 is closely aligned with or contacting the upper edge 138 of the right side wall 130 and the upper edge 158 of the left side wall 150. The recessed portion 184 of the top edge 183 is generally rectangular in the illustrated embodiment and comprises generally vertical side edges 89a and 89b and a generally horizontal bottom edge 88. The extended portion 178 is generally rectangular in the illustrated embodiment and comprises generally vertical side edges 87a and 87b and a generally horizontal bottom edge 86. The side edges 87a and 87b are closely aligned with or contact the side edges 89a and 89b when the top 170 is closed; the bottom edge 86 is closely aligned with or contacts the bottom edge 88 when the top 170 is closed.

The right side wall 130, the left side wall 150, the back wall 180, and the viewing frame 172 are curved to form their respective portions of the rotatable enclosure 125. The right side wall 130, the left side wall 150, and the back wall 180 share substantially similar, and gradually increasing, radii of curvature from top to bottom such that, when joined together with one another, they form a homogenous generally conical profile. This continuity in profile allows for positioning of the rotatable hunting blind 100 in the open due to its substantially uniform profile during rotation. In one embodiment, the right side wall 130, the left side wall 150, and the back wall 180 share a radius of curvature of 23 inches at their uppermost portion and a radius of curvature of 24 inches at their lowermost portion, this radii of curvature measured from a central vertical axis of the rotatable enclosure 125 to the outer surfaces of the respective component parts. Other radii of curvature are used in other embodiments.

The upper edge 138 of the right side wall 130, the upper edge 158 of the left side wall 150, and the upper edge 183 of the back wall 180 each slope downward and away from an inner surface (not shown) of the rotatable enclosure 125 to minimize rainwater and other moisture from entering the rotatable hunting blind 100. A lower edge 85 of the rim 177 of the top 170 is angled to align with the slope of the upper edge 138 of the right side wall 130, the upper edge 158 of the left side wall 150, and the upper edge 183 of the back wall 180. The lower edge 139 of the right side wall 130, the lower edge 159 of the left side wall 150, and a lower edge 209 of the back wall 180 are generally flat and spaced apart from the lower flange 112 of the base 110 to permit the rotatable enclosure 125 to rotate freely.

The viewing frame 172 of the top 170 comprises a central back portion 90 that extends from and is coextensive with the roof 171 and the bottom rim 177. The central back portion 90 is positioned above the extended portion 178 of the bottom rim 177 in the illustrated embodiment. The central back portion 90 is generally rectangular and is bounded on its right side by an edge 84 of the right viewing window 174 and on its left side by an edge 83 of the right viewing window 175.

The right side wall 130, the left side wall 150, and the back wall 180 are substantially uniform in thickness. In one embodiment, the right side wall 130, the left side wall 150, and the back wall 180 have a thickness of two inches.

The openings 166a and 166b of the left side wall 150 are in the same plane as the openings 185a and 185b of the back wall 180 and the openings 80a and 80b of the right side wall 130, respectively. The lowermost openings 166a, 185a, and 80a receive fasteners (not shown) that may connect the enclosure 125 to the seat 200 (FIG. 1), or the uppermost openings 166b, 185, and 80b may be used to connect the enclosure 125 to the seat 200, depending upon the desired spacing between the windows 173 (FIG. 2), 174 and 175 and the seat 200, as discussed above.

Figure 4:
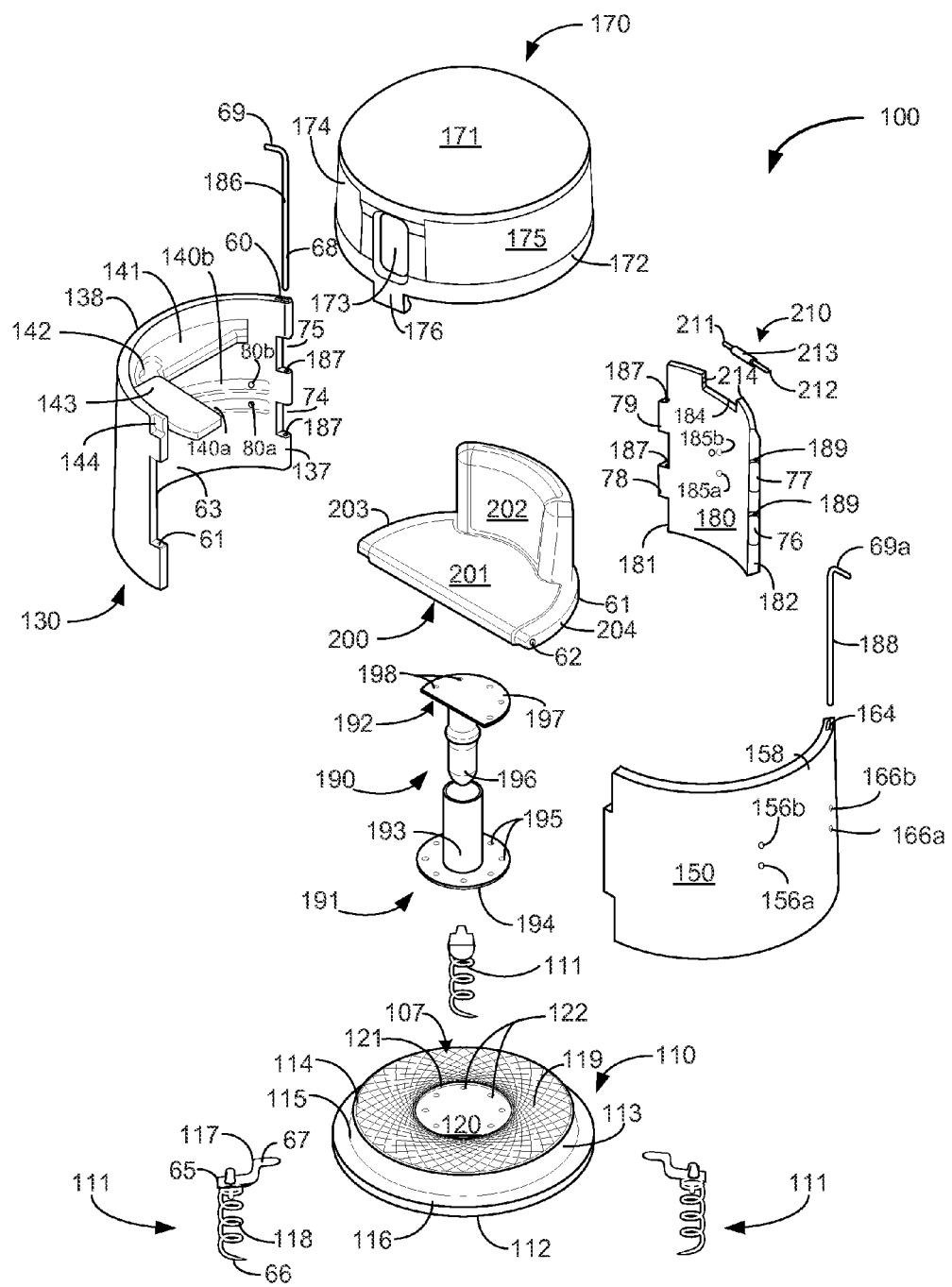
FIG. 4 is an exploded view of the rotatable hunting blind of FIG. 1.

FIG. 4 is an exploded view of the exemplary embodiment of the rotatable hunting blind 100 shown in FIG. 1. The base 110 comprises a lower flange 112 and a raised platform 113. The lower flange 112 rests upon the surface (not shown) upon which the rotatable hunting blind 100 is resting. The raised platform 113 extends upwardly from, and is integrally formed with, the lower flange 112.

The raised platform 113 is generally circular and is tapered such that the diameter of an upper edge 114 of the raised platform 113 is smaller than the diameter of a lower edge 115 of the raised platform 113. The lower flange 112 is generally circular with a uniform diameter that is greater than the diameter of the lower edge 115 of the raised platform 113 to a degree sufficient to allow the lower flange 112 to form an outer collar 116 around the raised platform 113. In one embodiment, the outer diameter of the lower flange 112 measures 48 inches and a diameter of the lower edge 115 of the raised platform 113 measures 40 inches, such that the width of the outer collar 116 measures four (4) inches. Other dimensions may be used with other embodiments. The raised platform 113 has a height sufficient to allow the height of the rotatable enclosure 125 to be adjusted without exposing the inside of the rotatable enclosure 125 to view from the outside of the rotatable hunting blind 100. In one embodiment, the height of the raised platform 113 measures six (6) inches. Other measurements are used with other embodiments. Further, shapes other than circular may be used in other embodiments of the rotatable hunting blind 100.

The base 110 is secured to the surface (not shown) upon which the rotatable hunting blind 100 rests by one or more clamps 111. Although three (3) clamps 111 are shown in the illustrated embodiment, more or fewer clamps 111 may be used in other embodiments. Further, means other than the clamps 111 are used in other embodiments to secure the blind 100 to the surface. In the illustrated embodiment, the clamps 111 are comprised of a bracket 117 and a fastener 118. The hunter is able to rigidly secure the rotatable hunting blind 100 to the surface upon which it rests by placing one or more brackets 117 along the lower flange 112 of the base 110 and securing the base 110 to the surface upon which the rotatable hunting blind 100 rests with the fasteners 118. In one embodiment, this surface is the ground, which allows for ease in assembly and promotes safe hunting.

In the illustrated embodiment, the bracket 117 comprises an upper arm 67 that engages with the outer collar 116 of the base 110 to secure the base 110. In this regard, the upper arm 67 is dimensioned to extend over and contact the outer collar 116. The bracket 117 further comprises a lower end 65 that comprises an opening (not shown) for receiving the fastener 118. In this embodiment, the fastener 118 comprises a helical stake 66 that the hunter (not shown) rotationally drives into the ground (not shown) to secure the bracket 117 and the base 110 to the ground.

An upper surface 107 of the raised platform 113 comprises an outer portion 119 and an inner portion 120. The outer portion 119 extends from the upper edge 114 of the raised platform 113 to an inner perimeter 121 on the upper surface 107 of the raised platform 113. The outer portion 119 provides a fixed circular surface that allows the hunter to use his or her feet to rotate the rotatable enclosure 125. The inner portion 120 provides a circular flat surface to which a seat base 190 is attached. The inner portion 120 comprises a plurality of threaded cavities or inserts 122 arranged in a generally circular fashion about a central vertical axis (not shown) of the raised platform 113. The seat base 190 is rigidly attached to the inner portion 120 of the upper surface 107 of the raised platform 113 with fasteners (not shown) that thread into the threaded cavities or inserts 122.

The seat base 190 is comprised of a fixed sleeve 191 and a rotating column 192. The fixed sleeve 191 is comprised of a generally hollow vertical cylinder 193 and a lower flange 194. The lower flange 194 comprises a plurality of openings 195 that align with the threaded cavities or inserts 122 on the inner portion 120 of the upper surface 107 of the raised platform 113. The fixed sleeve 191 is rigidly attached to the raised platform 113 with fasteners (not shown) that pass through the holes 195 and thread into the threaded cavities or inserts 122. In other embodiments, other means may be used to secure the seat base 190 to the base 110.

The rotating column 192 is comprised of a tapered shaft 196 and a seat plate 197. The tapered shaft 196 spins freely and quietly within the hollow vertical cylinder 193. The seat plate 197 is rigidly affixed to an upper portion of the tapered shaft 196. The seat plate 197 comprises a generally flat plate formed in the general shape of a half-circle and comprises openings 198 arranged in a semi-circular fashion about the central vertical axis of the raised platform 113. These openings receive fasteners (not shown) that rigidly affix the rotating column 192 to a swivel seat 200.

The fixed sleeve 191 and the rotating column 192 may be formed from any suitably strong and rigid materials, such as metal, composite, plastic, or the like. In one embodiment, the fixed sleeve 191 and the rotating column 192 are constructed of high strength injection-molded plastic. One or more Teflon rings (FIG. 5) may be affixed to the tapered shaft 196 to promote free and quiet spinning of the rotating column 192. A Teflon insert (FIG. 5) may also be placed on the inside of the hollow vertical cylinder 193 to promote free and quiet spinning of the rotating column 192.

The swivel seat 200 is rigidly connected to the rotating column 192, which allows the hunter (not shown) to rotate the rotatable enclosure 125 a full 360 degrees from a seated position in the swivel seat 200. This feature of the present disclosure allows the hunter to rotate the rotatable hunting blind 100 a full 360 degrees without changing his or her seating position or gun rest. The swivel seat 200 comprises the bench seat 201 and the back rest 202, which provide comfort and promote accurate shooting. The bench seat 201 and the back rest 202 are generally shaped to align with the inside of the rotatable enclosure 125 formed by the right side wall 130, the left side wall 150, and the back wall 180. In one embodiment, the swivel seat 200 is constructed of double-walled, rotationally molded and/or blow-molded polyethylene.

The swivel seat 200 attaches to the back wall 180 with one or more fasteners (not shown). The fasteners pass through one or more openings 185a or 185b in the back wall 180 and thread into one or more threaded cavities or inserts (not shown) in the bench seat 201 of the swivel seat 200. The rigid connection between the back wall 180 and the swivel seat 200 provides a stable structure to support the hinged connection between the back wall 180 and the top 170.

The right edge 203 of the bench seat 201 fits inside one of a plurality of generally horizontal slots 140b and 140a molded into an inner surface 63 of the right side wall 130. Although the illustrated embodiment shows two (2) slots 140b and 140a, the right side wall 130 may comprise more or fewer slots in other embodiments. In a similar fashion, the left edge 204 of the bench seat 201 fits into one of a plurality of generally horizontal slots (not shown) molded into the inner surface (not shown) of the left side wall 150. The plurality of slots 140b and 140a in the inner surface 63 of the right side wall 130 and the corresponding plurality of slots (not shown) in the inner surface (not shown) of the left side wall 150 permit the height of the swivel seat 200 to be adjusted relative to the top 170, and therefore relative to the shooting window 173, the right viewing window 174, and the left viewing window 175, as further discussed herein.

The slot 140b comprises the openings 80b and 136b (FIG. 2). The slot 140a comprises the openings 80a and 136a (FIG. 2). The openings 80b, 80a, 136b, and 136a receive fasteners (not shown) that attach the right side wall 130 to the swivel seat 200. Similarly, the left side wall 150 contains the openings 156a, 156b, 166a, and 166b that extend through the wall 150 to receive fasteners (not shown) that affix the left side wall 150 to the swivel seat 200. The swivel seat 200 contains a plurality of threaded cavities or inserts along the perimeter of the bench seat 201 that receive fasteners (not shown). (Cavities 62 and 61 are shown in FIG. 4; the remaining cavities are not shown.) Cavity 62 aligns with one of the openings 156b or 156a, depending on the desired seat orientation, to receive a fastener (not shown) that affixes the left side wall 150 to the bench seat 201. Similarly, cavity 61 aligns with the one of the openings 166b or 166a.

When the right side wall 130 and the left side wall 150 are connected and interlocked together, the location of the openings 156b, 156a, 166b, and 166a in the left side wall 150 generally mirrors the location of the openings 136b (FIG. 2), 136a (FIG. 2), 80b, and 80a, respectively, in the right side wall 130.

As discussed in further detail above, the swivel seat 200 should be attached to either the right side wall 130 or the left side wall 150 with fasteners (not shown), but not to both walls 130 and 150 at the same time. This is because one of the side walls must remain free to pivot open to allow the hunter (not shown) to enter and exit the rotatable hunting blind 100. Thus, the hunter determines during assembly whether the right side wall 130 or the left side wall 150 is desired to swing open and act as a door to the rotatable hunting blind 100. When the rotatable hunting blind 100 is in the closed position, the swivel seat 200 rests within one of the multiple slots of the side wall to which it is not attached, which provides additional structural support to the swivel seat 200, even without a fastener connection.

The inner surface 63 of the right side wall 130 and the inner surface (not shown) of the left side wall 150 contain multiple features that facilitate a comfortable and successful hunt. An armrest 141 and a binoculars/cup holder 142 are attached to the inner surface 63 of the right side wall 130. The left side wall 150 also comprises an armrest (not shown) and binoculars/cup holders (not shown), which may be positioned as mirror images of the armrest 141 and binoculars/cup holder 142 on the right side wall 130. The right side wall 130 also contains a shooting tray 143, which protrudes inwardly from a front upper left corner of the right side wall 130. The shooting tray 143 provides a secure platform in front of and below the shooting window 173. In one embodiment, the shooting tray 143 provides the hunter a flat rectangular surface that measures 14 inches in length and 7 inches in width. The shooting tray 143 may be differently sized and shaped in other embodiments.

FIG. 4 also depicts the recessed portion 144 of the upper extended portion 132 of the front side edge 131 of the right side wall 130. The top handle 176 on the top 170 connects to and interlocks with the recessed portion 144 to secure the top 170 in place when the rotatable hunting blind 100 is in its closed position.

The right hinge pin 186 hingedly connects the right side wall 130 to the back wall 180 and allows the right side wall 130 to pivot about a vertical axis of the hinge pin 186. The right hinge pin 186 is generally L-shaped and comprises a generally straight rod portion 68 and a handle portion 69 that is generally perpendicular to the rod portion 68. The rear side edge 137 of the right side wall 130 and the right side edge 181 of the back wall 180 comprise generally vertical cylindrical openings 187 that align to receive the placement of the right hinge pin 186. The right hinge pin 186 has a length substantially similar to the height of the right side wall 130. The rear of the upper edge 138 of the right side wall 130 contains a recession 60 that receives the handle portion 69 of the right hinge pin 186. The recession 60 is sized slightly larger than the handle portion 69 of the right hinge pin 186 and allows the handle portion 69 to recess into the upper edge 138 so as not to interfere with the top 170 when the top 170 is closed.

The left hinge pin 188 hingedly affixes the left side wall 150 to the back wall 180 and allows the left side wall 150 to pivot about a vertical axis (not shown) of the left hinge pin 188. The left hinge pin 188 is generally L-shaped and is substantially similar to the right hinge pin 186. The rear side edge 157 (FIG. 3) of the left side wall 150 and the left side edge 182 of the back wall 180 comprise generally vertical cylindrical openings 189 that align to receive the placement of the left hinge pin 188. The left hinge pin 188 has a length substantially similar to the height of the left side wall 150. The rear of the upper edge 158 of the left side wall 150 contains a recession 164 that receives a handle portion 69a of the left hinge pin 188. The recession 164 is sized slightly larger than the handle portion 69a of the left hinge pin 188 and allows the handle portion 69a to recess into the upper edge 158 so as not to interfere with the top 170 when the top 170 is closed.

FIG. 4 further depicts a top hinge 210 that hingedly affixes the back wall 180 to the top 170. In the illustrated embodiment, the top hinge 210 is comprised of longitudinally opposed metal pins 211 and 212 received by a collar 213 comprising a compression spring (not shown) that applies force on the metal pins 211 and 212. The metal pins 211 and 212 are pushed inwardly (toward one another) to compress the hinge 210 and permit the hinge 210 to be positioned in place as required to hingedly affix the back wall 180 to the top 170, as further discussed herein with respect to FIG. 6. In another embodiment, other hinged connections, such as a double screw, are used to hingedly affix the back wall 180 to the top 170.

Figure 5:
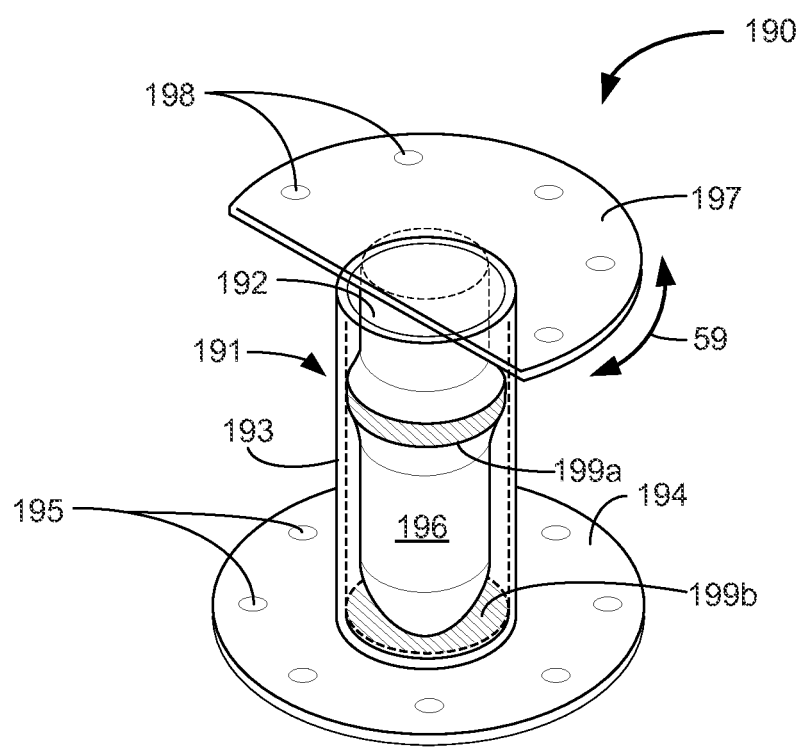
FIG. 5 is an enlarged perspective view of the seat base of FIG. 4.

FIG. 5 is an enlarged perspective view of an assembled seat base 190. The seat base 190 is comprised of a fixed sleeve 191 and a rotating column 192. The fixed sleeve 191 is illustrated as transparent in FIG. 5 for the purpose of explanation only. The fixed sleeve 191 is comprised of a generally hollow vertical cylinder 193 rigidly affixed to a lower flange 194. The lower flange 194 comprises a generally flat, generally circular disk rigidly affixed to the cylinder 193. The lower flange 194 further comprises a plurality of openings 195 that align with the threaded cavities or inserts 122 (FIG. 4) on the base 110 (FIG. 4). The fixed sleeve 191 is rigidly attached to the base 110 via fasteners (not shown) that extend through the openings 195 and thread into the threaded cavities or inserts 122, as further discussed above.

The rotating column 192 is comprised of a tapered shaft 196 and the seat plate 197. The tapered shaft 196 spins freely and quietly within the hollow vertical cylinder 193. The seat plate 197 is rigidly affixed to the tapered shaft 196. The seat plate 197 comprises a plurality of openings 198 arranged in a semi-circular fashion about the central vertical axis (not shown) of the rotating column 192. These openings receive fasteners (not shown) that rigidly affix the rotating column 192 to the swivel seat 200 (FIG. 4).

In the embodiment of the disclosure depicted in FIG. 4, the tapered shaft 196 comprises a Teflon ring 199*a* surrounding its widest portion. The Teflon ring 199*a* is disposed between the shaft 196 and the cylinder 193 and facilitates smooth and quiet spinning of the shaft 196 within the cylinder 193. The hollow vertical cylinder 193 comprises a Teflon insert 199*b* disposed between the shaft 196 and the lower flange 194. The Teflon insert 199*b* further facilitates smooth and quiet spinning of the shaft 196 within the cylinder 193. The tapered shaft 196 is tapered as shown to minimize points of contact and friction with the cylinder 193 and to promote quiet rotation.

FIG. 6 depicts a perspective view of the rotatable hunting blind 100 assembled and in the open position. In the illustrated embodiment, the right side wall 130 is rigidly affixed to the swivel seat 200. The left side wall 150 is not affixed to the swivel seat 200, so it remains free to pivot open as shown to allow the hunter (not shown) to enter the rotatable hunting blind 100. When the left side wall 150 is pulled inward and closed by the hunter so that it connects with the right side wall 130 and locks in place, the left edge 204 of the bench seat 201 rests within one of the plurality of slots 160*b* or 160*a* molded into an inner surface 41 of the left side wall 150. The slot 160*b* or 160*a* provides additional support to the swivel seat 200.

The edge 151 of the left side wall 150 comprises a recess 167 that the hunter (not shown) may use as a handle to aid in opening the left side wall 150 to enter the enclosure 125. The recess 167 is an indentation sized to receive the hunter's fingers (not shown).

FIG. 6 also depicts the hinged connection between the back wall 180 and the top 170. The top hinge 210 is located within the extended portion 178 (FIG. 3) of the bottom rim 177 of the top 170. In the depicted embodiment, the top hinge 210 is comprised of longitudinally opposed pins 211 and 212 within a collar 213 comprising a compression spring (not shown) that exerts a force on the pins 211 and 212 urging the pins 211 and 212 outward. The pins 211 and 212 are fully extended through openings (not shown) extending through the extended portion 178 of the top 170 and openings (not shown) extending through the top edge 183 of the back wall 180. The extended portion 178 is received by and fits within the recessed portion 184 (FIG. 4) of the back wall 180. The top hinge 210 allows the top 170 to rotate a full 90 degrees between its open and closed positions. The top 170 rests in its open position without the need for additional support, which allows the hunter (not shown) to enter and exit the rotatable hunting blind without the top 170 falling. In an alternative embodiment, the hinge 210 could be ratcheted to allow the top 170 to ratchet up and down, stopping at multiple positions along the way.

Figure 7:
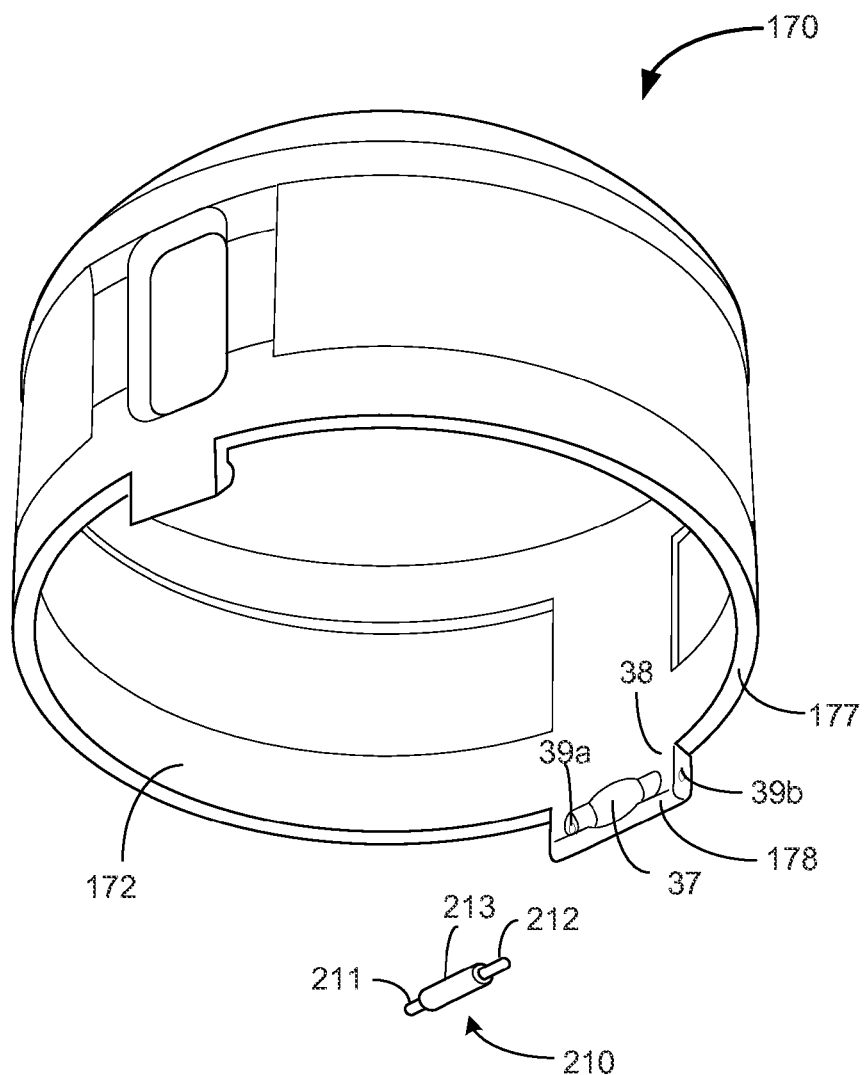
FIG. 7 is an enlarged front/inner side perspective view of the top of the rotatable hunting blind of FIG. 1.

FIG. 7 is an enlarged perspective view of the top 170 of FIG. 6 before the top is installed on the enclosure 125 (FIG. 6). The top 170 comprises the extended portion 178 that extends downwardly from the bottom rim 177 of the viewing frame 172. A recession 37 is recessed within an inner surface 38 of the extended portion 178 and receives the hinge 210 (shown removed from the top 170). The recession is sized and shaped to receive the hinge 210. Openings 39*a* and 39*b* extend through the extended portion 178 and receive the pins 211 and 212 of the hinge 210. To install the hinge 210 into the recession 37, the hunter (not shown) positions the top such that the extended portion 178 is within the recessed portion 184 (FIG. 4) of the back wall 180 (FIG. 4) and compresses the pins 211 and 212 so that the pin 211 is insertable through the opening 39*a* and the pin 212 is insertable into the opening 39*b*. When the hunter releases the pins 211 and 212, the pins 211 and 212 extend into openings (not shown) in the back wall 180 to hingedly affix the top 170 to the back wall 180.

FIGS. 8-10 demonstrate the process by which the hunter 250 enters the rotatable hunting blind 100. In FIG. 8, the hunter 250 has opened the top 170 to its open position by using the top handle 176. In this open position, the top 170 has been opened a full 90 degrees from its closed position. In FIG. 9, the hunter 250 has opened the left side wall 150. Thus, in the embodiment depicted in FIG. 9, the right side wall 130 is rigidly attached to the swivel seat 200, and the left side wall 150 is not. In FIG. 10, the hunter 250 is sitting down inside the rotatable hunting blind 100 and reaching to close the top 170 by grasping the edge of an overhead storage shelf 220 that is attached to the interior of the top 170.

Figure 11:
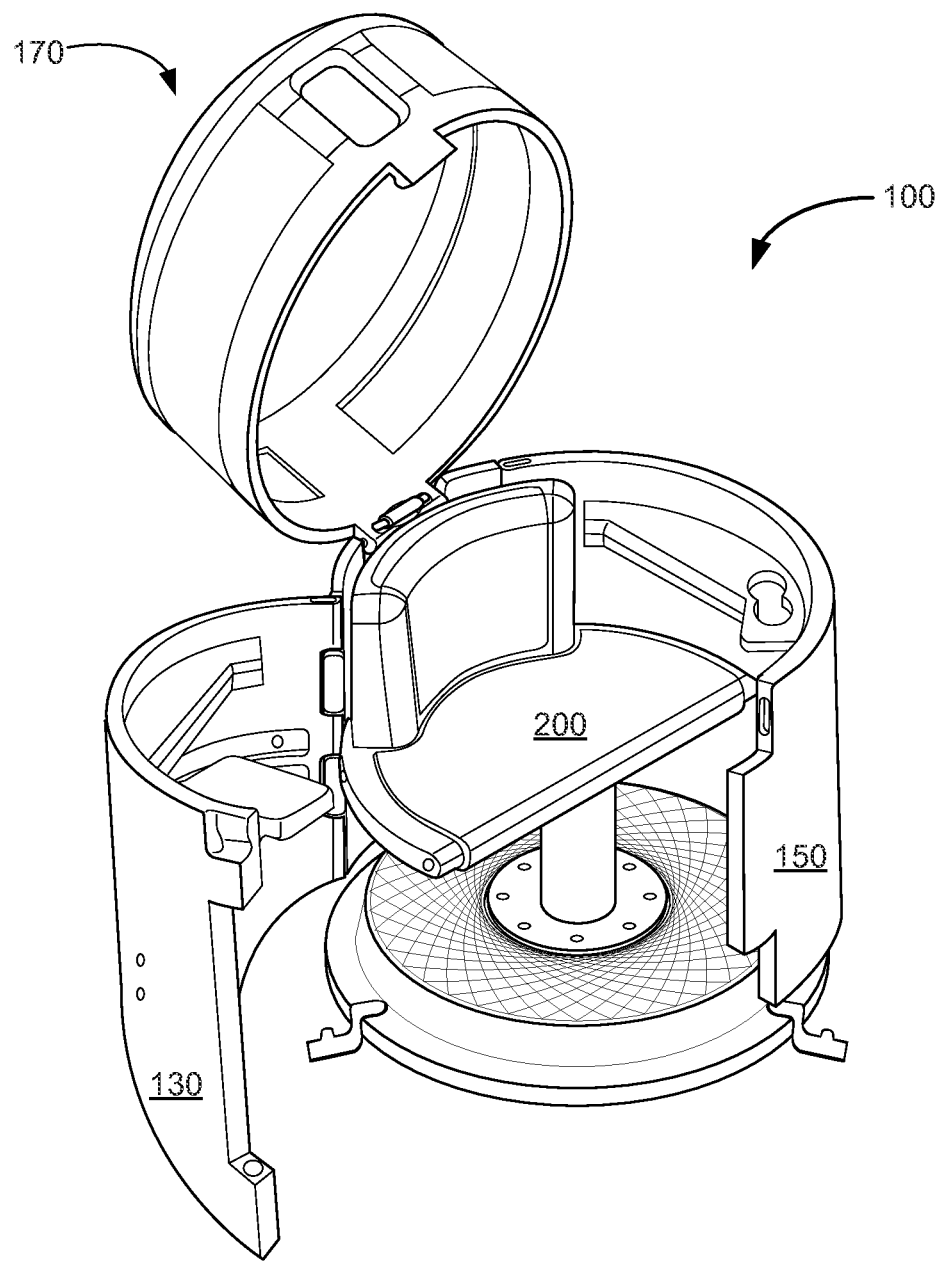
FIG. 11 is a front/side perspective view of the rotatable hunting blind of FIG. 1 with the top and right side wall in the open position.

FIG. 11 depicts an alternative embodiment of the present disclosure in which the left side wall 150 is connected to the swivel seat 200, and the right side wall 130 is not connected to the swivel seat. Thus, to enter the rotatable hunting blind 100, the hunter (not shown) lifts the top 170 and then opens the right side wall 130 instead of the left side wall 150. During assembly, the hunter can choose which side wall he would prefer to open to enter the blind and can assemble the blind accordingly.

Figure 12:
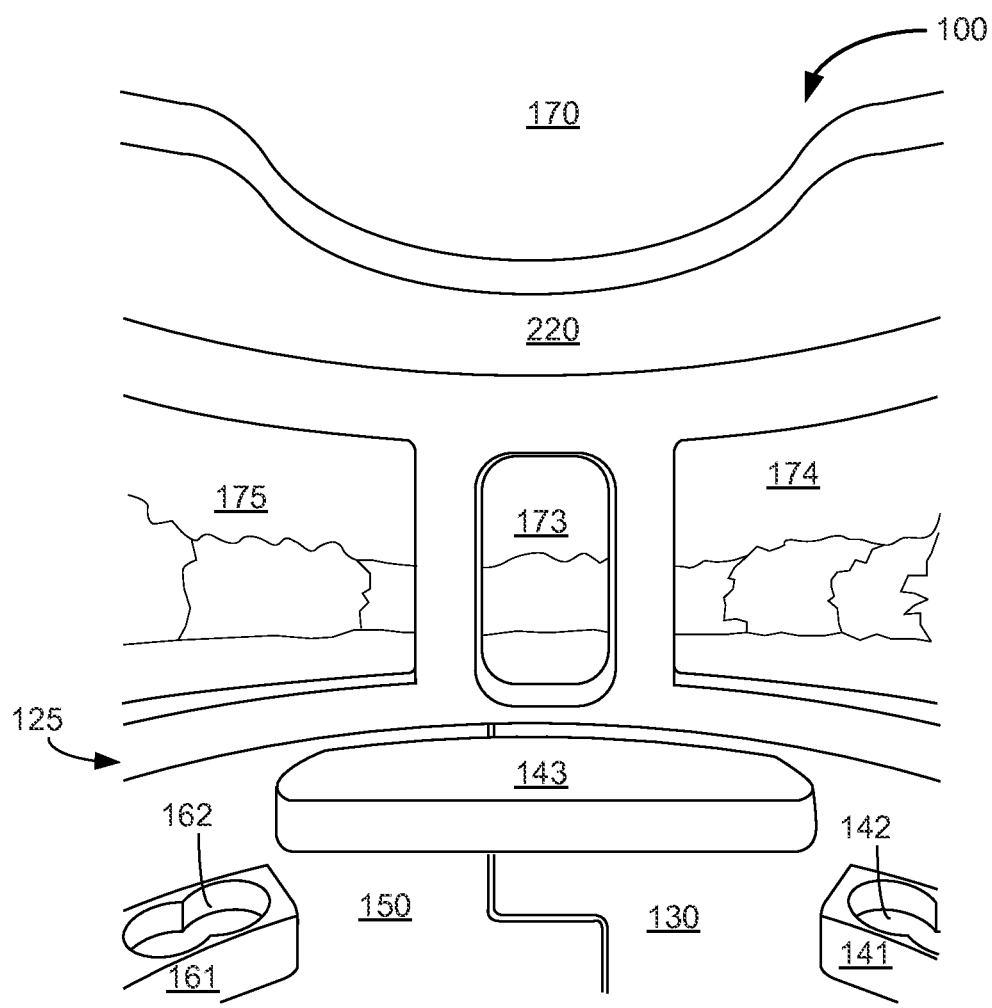
FIG. 12 is an inside perspective view of the rotatable hunting blind of FIG. 1.

FIG. 12 depicts the interior view of the blind 100 as seen by the hunter (not shown) once he or she is seated on the swivel seat 200 within the enclosure 125. The overhead storage shelf 220 is attached to the interior of the top 170. Binoculars/cup holders 142 and 162 are molded into the armrest 141 of the right side wall 130 and the armrest 161 of the left side wall 150, respectively.

From a seated position within the blind 100, the hunter can observe game (not shown) through the right viewing window 174, the left viewing window 175, and the shooting window 173. The hunter can extend a gun (not shown) outside of the shooting window 173 to shoot game. The shooting tray 143 protrudes from the right side wall 130 and provides a secure platform in front of and below the shooting window 173 to further stabilize the hunter and gun and promote to comfortable and accurate shooting. The hunter is free to use his feet (not shown) to rotate the rotatable enclosure 125 for a full 360 degrees, and his view of the interior of the rotatable hunting blind 100 depicted by FIG. 12 will remain constant during rotation.

Figure 13:
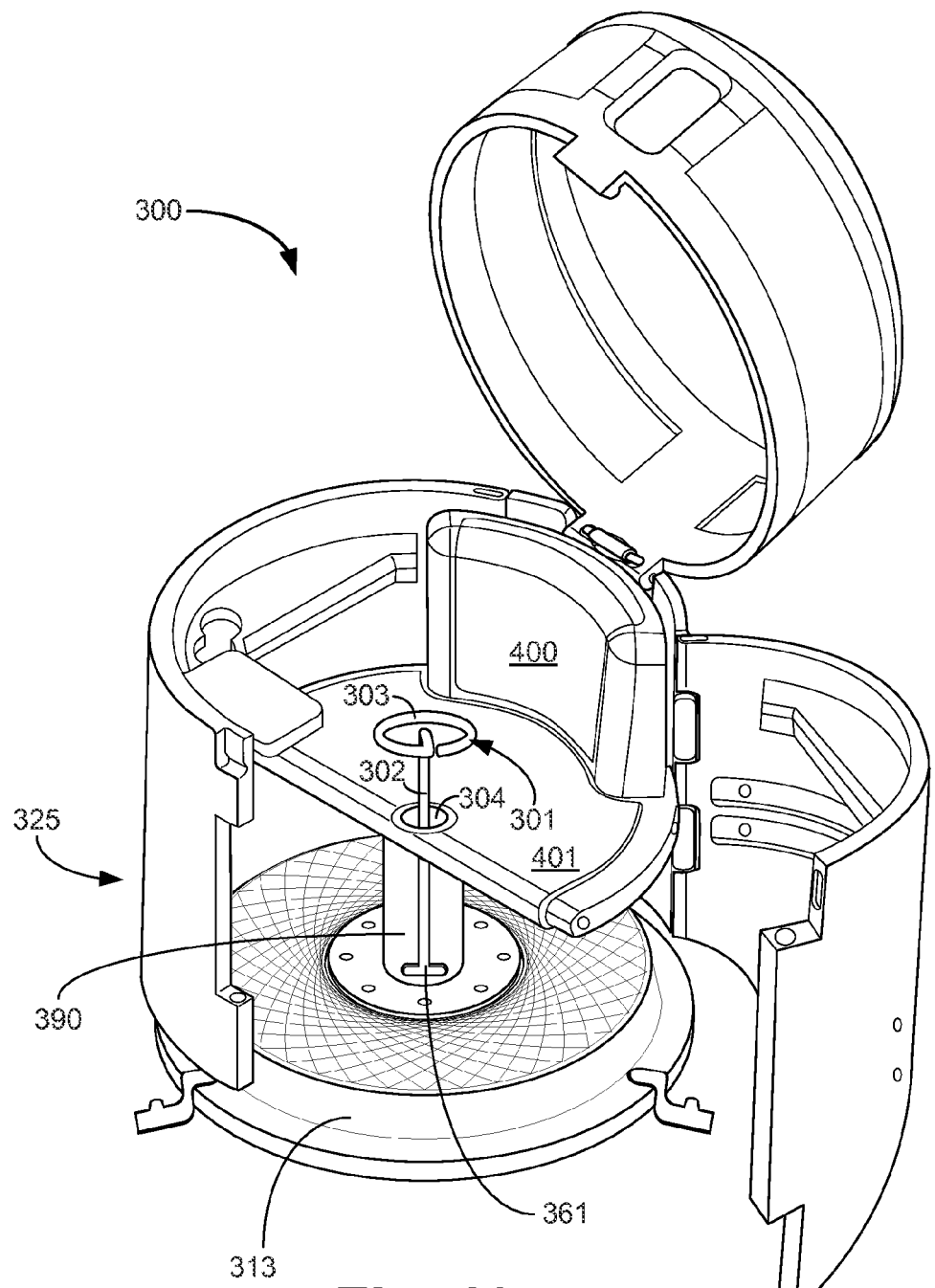
FIG. 13 is a front/side perspective view of a rotatable hunting blind according to an alternative embodiment of the present disclosure.

FIG. 13 depicts an alternative embodiment of the present disclosure, namely a rotatable hunting blind 300 for disabled hunters. The rotatable hunting blind 300 incorporates all of the previously described components and features of the rotatable hunting blind 100 and also incorporates a spin rod 301 that enables the hunter to rotate the rotatable enclosure 325 by using his or her hands (not shown) instead of his or her feet.

The spin rod 301 is comprised of a shaft portion 302 and a handle portion 303. The shaft portion 302 extends generally vertically along a central axis (not shown) of the rotatable enclosure 325 from a raised platform 313 to a height above a bench seat 401 sufficient to allow the handle portion 303 to rest above the hunter's legs once he or she is seated. A cylindrical opening 304 extends generally vertically through the bench seat 401 to allow the spin rod 301 to pass through the bench seat 401. The seat plate (not shown) that connects the swivel seat 400 to the seat base 390 and the rotating column (not shown) also have cylindrical holes of diameters sufficient to allow the shaft portion 302 to extend through them unobstructed.

A lower end 361 of the shaft portion 302 rigidly affixes to the raised platform 313 and is detachable from the same to allow the hunter to remove it while he or she is entering the blind and to replace it once he or she is seated. The hunter then rotates the rotatable enclosure 325 by twisting the handle portion 303 of the spin rod 301. The spin rod may be formed from any suitably strong and rigid material, such as metal, plastic or composite materials, and the like. In one embodiment, the spin rod 301 is constructed of solid aluminum and has a height of thirty (30) inches. Other materials and heights may be used.

Figure 14:
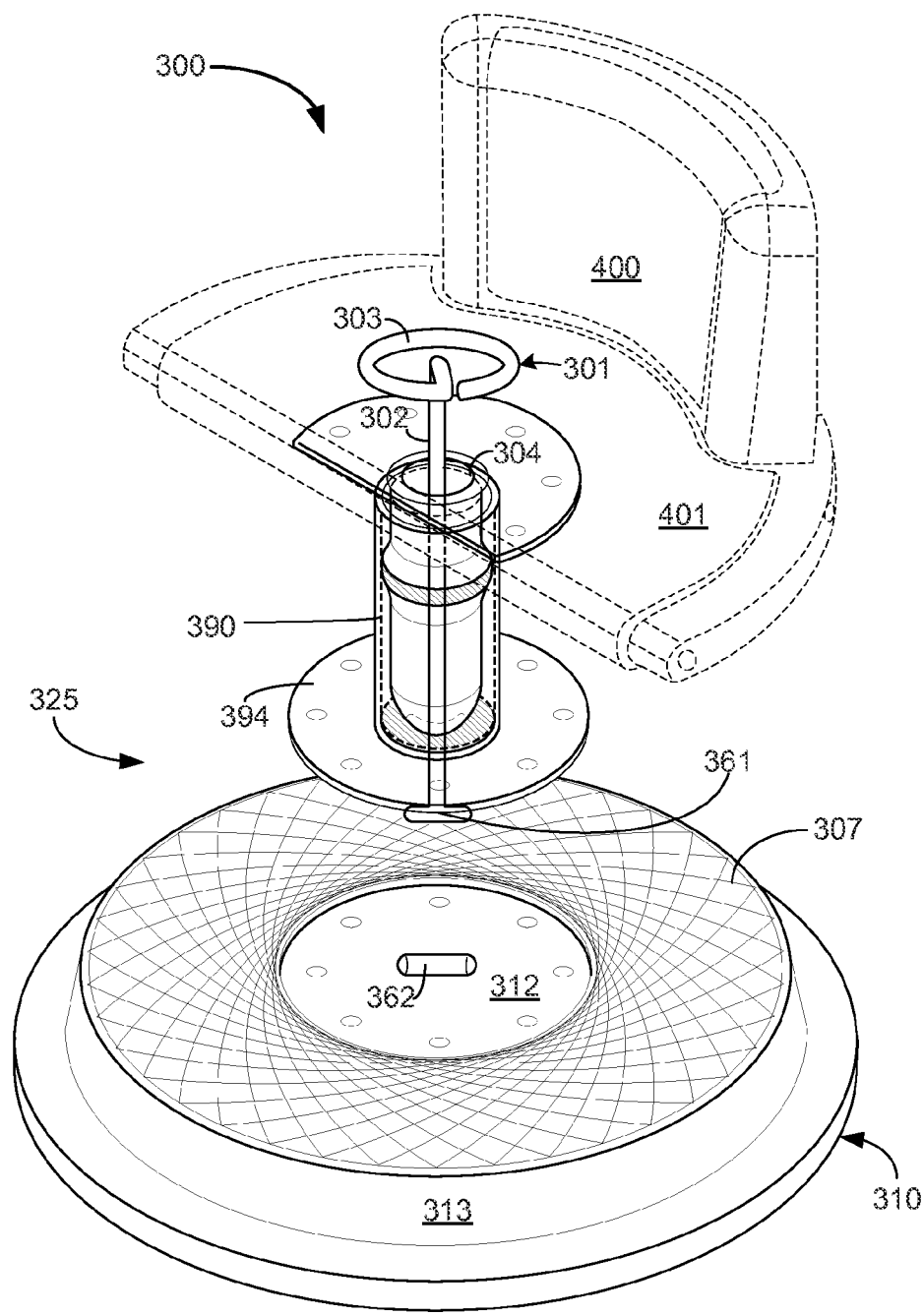
FIG. 14 is a partially exploded view of the rotatable hunting blind of FIG. 13.

FIG. 14 is a partially exploded view of the rotatable hunting blind 300 of FIG. 13, further illustrating the attachment of the spin rod 301 to the base 310. An upper surface 307 of the raised platform 313 comprises an inner portion 312 that receives a lower flange 394 of the seat base 390. The inner portion 312 comprises a recession 362 that receives a lower end 361 of the shaft portion 302 of the spin rod 301. In this regard, the recession 362 is sized and shaped slightly larger than the lower end 361 of the shaft portion 302 and retains the lower end 361 during operation of the spin rod 301, thus rigidly affixing the spin rod 301 to the base 310. When the user (not shown) applies rotational torque on the handle portion 303, the swivel seat 400 and enclosure (not shown) will rotate about the spin rod 301, thus rotating the enclosure.

Figure 15:
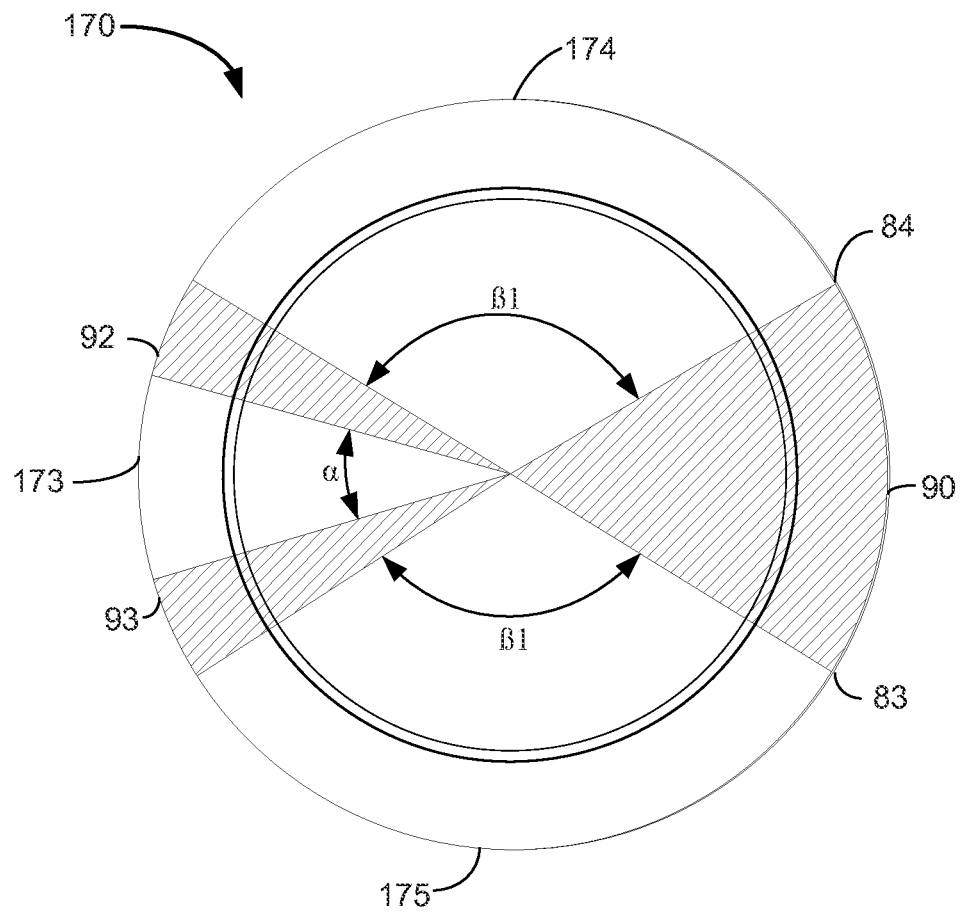
FIG. 15 is a top representational view of the rotatable blind of FIG. 1, illustrating the angular line of sight provided by the windows.

FIG. 15 is a top representational view of the rotatable blind of FIG. 1, illustrating the angular line of sight provided by the shooting window 173, right viewing window 174, and left viewing window 175. In this regard, the shooting window 173, which is disposed between the left roof support 92 and the right roof support 93, provides a viewing field of generally "α" degrees. In the illustrated embodiment, α is approximately 32 degrees. The right viewing window 174, which is disposed between the right roof support 93 and the edge 84 of the right viewing window 174, provides a viewing field of generally "β1" degrees. In the illustrated embodiment, β1 is approximately 118 degrees. The left viewing window 175, which is disposed between the left roof support 92 and the edge 83 of the left viewing window 175, provides a viewing field of generally "β2" degrees. In the illustrated embodiment, β2 is approximately 118 degrees. The hunter (not shown) thus has a viewing angle of generally 268 degrees in the illustrated embodiment without changing position.

Figure 16:
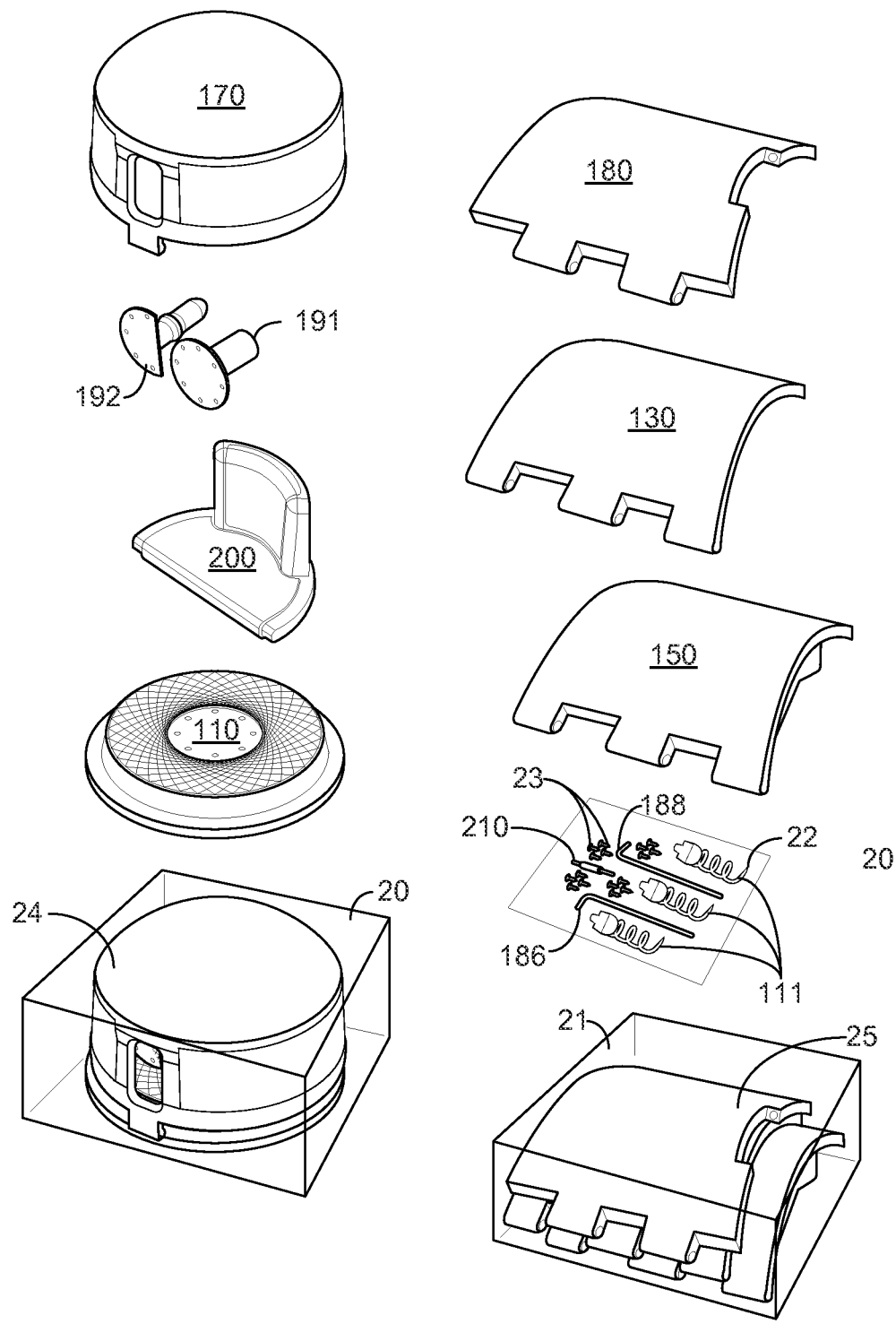
FIG. 16 depicts the rotatable hunting blind of FIG. 1 in an unassembled state.

FIG. 16 depicts the rotatable hunting blind 100 of FIG. 1 in an unassembled state, illustrating the modularity of the component parts for shipping/transport. In this regard, the entire blind 100 (FIG. 1) may be transported for shipment in two (2) boxes, box 20 and box 21. Box 20 may comprise the base 110, the swivel seat 200, fixed sleeve 191, the rotating column 192, and the top 170, stacked atop one another in that order to form a stack 24 that is received by the box 20. Box 21 may comprise the small component parts 22 (e.g., the clamps 111, the right hinge pin 186, the left hinge pin 188, the top hinge 210, and a plurality of fasteners 23); the left side wall 150, the right side wall 130, and the back wall 180, stacked atop one another to form a stack 25 that is received by the box 21.

Although the description herein discusses a hunter using the blind for hunting purposes, it is understood that the blind described herein could be used for other purposes, such as wildlife observation, photography, and the like, without departing from the scope of the present disclosure.

In addition to the benefits provided by the embodiments described in detail herein, blind 100 serves to amplify outside sounds, while muffling sounds emanating from within the rotatable enclosure 125. In addition, the rotatable enclosure can be base-vented to cool the hunter on warm days, and it also exhibits thermal properties to warm the hunter on cold days.

In one embodiment, the component parts of the rotatable enclosure 125 are constructed of double-walled, rotationally-molded and/or blow-molded polyethylene, which may be foam-filled to provide additional insulative properties. The polyethylene construction is durable, lightweight, and easily breaks down for shipping, transport, and set-up. It also conceals, or at least mitigates, human scent.

In an alternative embodiment (not illustrated), the outer surfaces of the right side wall 130 and the left side wall 150 may contain one or more inserts (not shown) to allow for the mounting of one or more cameras (not shown).

What is claimed is:

1. A device comprising:
a base rotatably connected to a rotatable enclosure, the rotatable enclosure formed by:
a back wall, a right side wall and a left side wall hingedly coupled to the back wall;
a seat located in the rotatable enclosure and rotatably coupled to the base, the seat dimensioned to receive an individual;
the seat rigidly affixed to the back wall;
wherein either the right side wall or the left side wall is also rigidly affixed to the seat after assembling, wherein the other of the right side wall or the left side wall is rotatably openable;
a top hingedly coupled to the back wall, and
wherein the rotatable enclosure maintains a substantially uniform profile as it rotates about a vertical axis of the base.

2. The device of claim 1, wherein an individual seated in the seat may rotate the rotatable enclosure 360 degrees about the vertical axis of the base by applying pressure to the base.

3. The device of claim 1, further comprising one or more clamps for securing the base to the surface upon which the base rests.

4. The device of claim 1, wherein the base, seat, right side wall, left side wall, back wall, and top are constructed of double-walled, rotationally molded or blow-molded polyethylene.

5. The device of claim 1, wherein upper edges of the right side wall, left side wall, and back wall are angled downwardly to slope away from an inside of the rotatable enclosure.

6. The device of claim 1, wherein the top rotates 90 degrees between an open position and a closed position.

7. The device of claim 1, wherein the rotatable enclosure flares outwardly from the top to a bottom edge of the rotatable enclosure.

8. The device of claim 1, further comprising a spin rod comprised of a shaft portion and a handle portion, wherein the shaft portion is attached to the base and extends upwardly along a vertical axis of the base through the seat to a moderate height above the seat, and the handle portion is affixed to an upper end of the shaft portion.

9. The device of claim 8, wherein an individual seated in the seat may rotate the rotatable enclosure 360 degrees about a vertical axis of the base by applying torque to the handle portion of the spin rod.

10. The device of claim 9 wherein the spin rod is detachable.

11. A device comprising:
a base rotatably connected to a rotatable enclosure, the rotatable enclosure comprising
  a seat rotatably coupled to the base, the seat dimensioned to receive an individual;
  a back wall rigidly affixed to the seat;
  a right side wall and a left side wall hingedly coupled to the back wall, wherein either the right side wall or the left side wall is also rigidly affixed to the seat; and
  a top hingedly coupled to the back wall,
wherein the rotatable enclosure maintains a substantially uniform profile as it rotates about a vertical axis of the base, wherein the top comprises a roof and a viewing frame,
wherein the viewing frame comprises one or more shooting windows and one or more viewing windows, and
wherein inside surfaces of the right side wall and left side wall each comprises a plurality of horizontal slots for receiving a side edge of the seat, thereby providing a means to adjust the height of the seat relative to the shooting window(s) and viewing window(s).

12. A device comprising:
a seat rotatably coupled to a base, the seat rotatable 360 degrees by a user applying rotational pressure on the base with the user's feet;
an enclosure rigidly affixed to the seat, the enclosure comprising a curved back wall, a curved right side wall hingedly coupled to the back wall, and a curved left side wall hingedly coupled to the back wall, the curved back wall, curved right side wall, and curved left side wall interconnecting to surround the seat, wherein either the right side wall or the left side wall is rigidly affixed to the seat after assembling; wherein the other of the right side wall or the left side wail is rotatably openable; and
a top hingedly coupled to the back wall, the top comprising a domed roof and a plurality of windows.

13. The device of claim 12, wherein the plurality of windows comprises a shooting window directly opposite from the back wall, a right viewing window disposed to of the shooting window and a left viewing window disposed leftward of the shooting window.

14. The device of claim 13, wherein the shooting window, the right viewing window, and the left viewing window combine to provide substantially 268 degrees of unobstructed viewing for the user without rotation of the enclosure.

15. The device of claim 12, wherein the base comprises a lower flange and a raised platform extending upwardly from the lower flange.

16. The device of claim 15, wherein the curved back wall, curved right side wall, and curved left side wall each extend from the top to a co-planar curved bottom edge that terminates above the lower flange and below the raised platform, forming a space between the lower flange and the curved bottom edge.

* * * * *